US012689711B2

(12) United States Patent
Baskaran

(10) Patent No.: US 12,689,711 B2
(45) Date of Patent: Jul. 21, 2026

(54) SYSTEMS AND METHODS FOR REAL TIME DEEPFAKE IDENTIFICATION USING KNOWLEDGE GRAPHS IN VIRTUAL MEETINGS

(71) Applicant: Project Karna Inc., Portland, OR (US)

(72) Inventor: Rajashree Baskaran, Portland, OR (US)

(73) Assignee: Project Karna Inc., Portland, OR (US)

( * ) Notice: Subject to any disclaimer, the term of this patent is extended or adjusted under 35 U.S.C. 154(b) by 132 days.

(21) Appl. No.: 18/926,794

(22) Filed: Oct. 25, 2024

(65) Prior Publication Data

US 2026/0122202 A1 Apr. 30, 2026

(51) Int. Cl.
H04N 7/15 (2006.01)
H04L 9/32 (2006.01)

(52) U.S. Cl.
CPC ........... H04N 7/157 (2013.01); H04L 9/3271 (2013.01)

(58) Field of Classification Search
CPC .............................. H04N 7/157; H04L 9/3271
See application file for complete search history.

(56) References Cited

U.S. PATENT DOCUMENTS

| | | | | |
|---|---|---|---|---|
| 12,368,907 | B1 * | 7/2025 | Fishman ........ | H04N 21/234345 |
| 2022/0021680 | A1 * | 1/2022 | Roedel ................... | H04N 7/155 |
| 2023/0388141 | A1 * | 11/2023 | Malan ................ | H04L 12/1822 |
| 2024/0363099 | A1 * | 10/2024 | Altaf ....................... | G10L 15/02 |
| 2025/0148788 | A1 * | 5/2025 | Bellinger ............... | G06V 20/46 |
| 2025/0165569 | A1 * | 5/2025 | Kronenberg ............ | G06F 21/31 |
| 2025/0200731 | A1 * | 6/2025 | Xu ........................ | G06V 40/176 |
| 2025/0238553 | A1 * | 7/2025 | Lindmark ............... | G06F 21/64 |
| 2025/0337607 | A1 * | 10/2025 | Bjørstrup ............ | H04L 12/1818 |
| 2025/0379862 | A1 * | 12/2025 | Koerper ............... | G06V 40/172 |
| 2026/0031090 | A1 * | 1/2026 | Bishop ................... | G10L 17/12 |
| 2026/0032151 | A1 * | 1/2026 | Baskaran ............ | H04L 63/1483 |
| 2026/0044584 | A1 * | 2/2026 | Wurmfeld ............... | G06F 21/32 |
| 2026/0089015 | A1 * | 3/2026 | Covington .............. | G06F 21/31 |
| 2026/0094461 | A1 * | 4/2026 | Schneider .......... | G06F 9/45558 |
| 2026/0106877 | A1 * | 4/2026 | Palanki ............... | H04L 63/1416 |
| 2026/0120513 | A1 * | 4/2026 | Matias ................... | G06V 40/40 |

FOREIGN PATENT DOCUMENTS

| | | | | | |
|---|---|---|---|---|---|
| KR | 20260053686 | A | * | 4/2026 | ............. H04M 3/56 |
| NO | 20240790 | A1 | * | 1/2026 | ............. G06V 40/45 |

* cited by examiner

*Primary Examiner* — Olisa Anwah
(74) *Attorney, Agent, or Firm* — Aambell PC

(57) ABSTRACT

An authenticating application may calculate trust scores of users based on respective authentication steps completed for access to a virtual meeting. Responsive to determining that one of the trust scores is below a trust score threshold, the application may instantiate a knowledge graph representing known associations between the users. An Artificial Intelligence (AI) engine may select content in the knowledge graph having a higher probability of being known to two users, one of the two having the low trust score. The AI engine may generate a question to be asked by the other user, the question comprising the content in the knowledge graph in a tone determined by a balancing algorithm that considers the organizational hierarchy of the two users. The response to the question by the user with the low trust score may be indicative of a likelihood of being a deepfake.

20 Claims, 13 Drawing Sheets

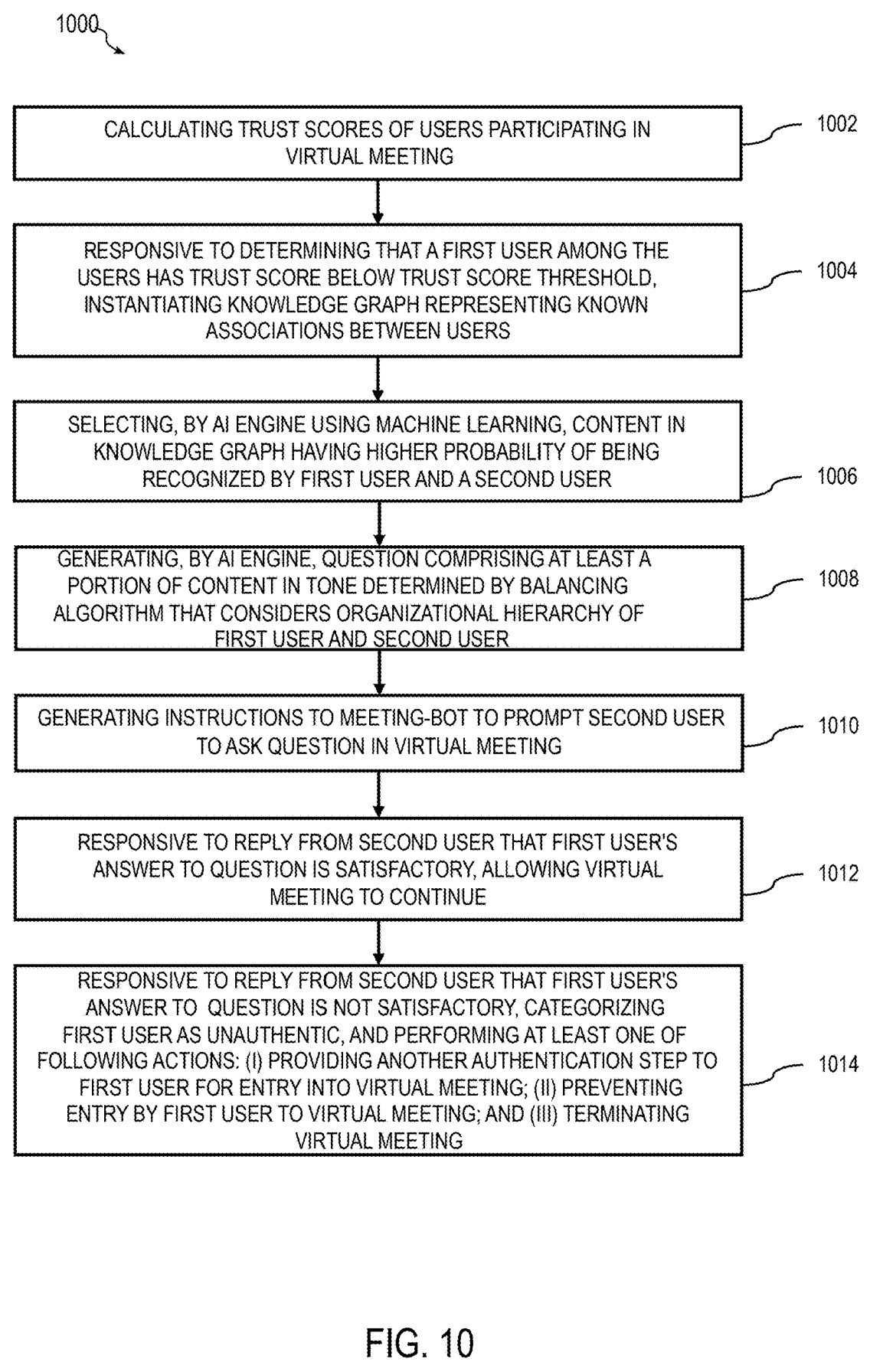

1000

| CALCULATING TRUST SCORES OF USERS PARTICIPATING IN VIRTUAL MEETING | 1002 |

| RESPONSIVE TO DETERMINING THAT A FIRST USER AMONG THE USERS HAS TRUST SCORE BELOW TRUST SCORE THRESHOLD, INSTANTIATING KNOWLEDGE GRAPH REPRESENTING KNOWN ASSOCIATIONS BETWEEN USERS | 1004 |

| SELECTING, BY AI ENGINE USING MACHINE LEARNING, CONTENT IN KNOWLEDGE GRAPH HAVING HIGHER PROBABILITY OF BEING RECOGNIZED BY FIRST USER AND A SECOND USER | 1006 |

| GENERATING, BY AI ENGINE, QUESTION COMPRISING AT LEAST A PORTION OF CONTENT IN TONE DETERMINED BY BALANCING ALGORITHM THAT CONSIDERS ORGANIZATIONAL HIERARCHY OF FIRST USER AND SECOND USER | 1008 |

| GENERATING INSTRUCTIONS TO MEETING-BOT TO PROMPT SECOND USER TO ASK QUESTION IN VIRTUAL MEETING | 1010 |

| RESPONSIVE TO REPLY FROM SECOND USER THAT FIRST USER'S ANSWER TO QUESTION IS SATISFACTORY, ALLOWING VIRTUAL MEETING TO CONTINUE | 1012 |

| RESPONSIVE TO REPLY FROM SECOND USER THAT FIRST USER'S ANSWER TO QUESTION IS NOT SATISFACTORY, CATEGORIZING FIRST USER AS UNAUTHENTIC, AND PERFORMING AT LEAST ONE OF FOLLOWING ACTIONS: (I) PROVIDING ANOTHER AUTHENTICATION STEP TO FIRST USER FOR ENTRY INTO VIRTUAL MEETING; (II) PREVENTING ENTRY BY FIRST USER TO VIRTUAL MEETING; AND (III) TERMINATING VIRTUAL MEETING | 1014 |

FIG. 10

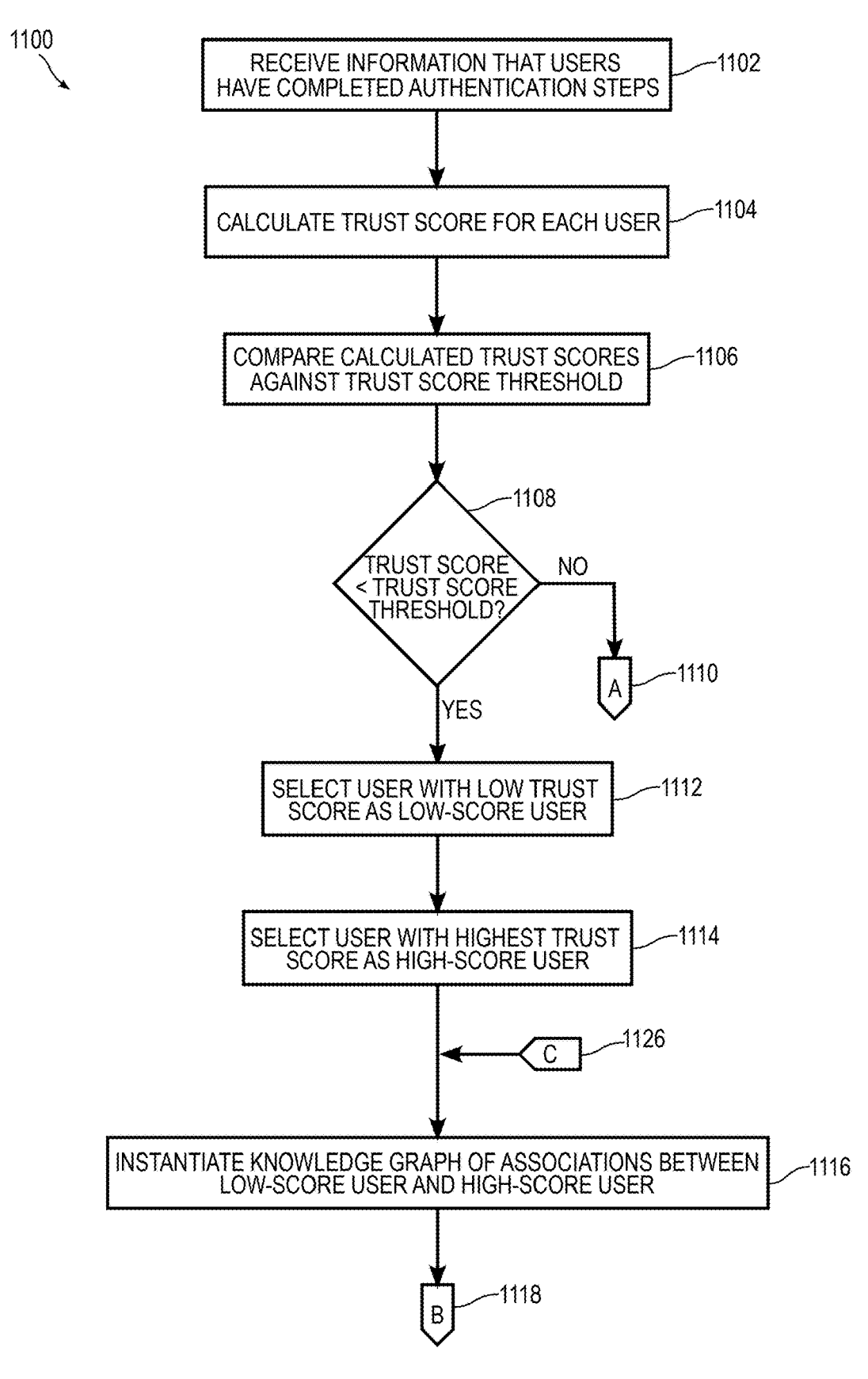

1100

RECEIVE INFORMATION THAT USERS HAVE COMPLETED AUTHENTICATION STEPS ——1102

CALCULATE TRUST SCORE FOR EACH USER ——1104

COMPARE CALCULATED TRUST SCORES AGAINST TRUST SCORE THRESHOLD ——1106

1108
TRUST SCORE < TRUST SCORE THRESHOLD?

NO

A ——1110

YES

SELECT USER WITH LOW TRUST SCORE AS LOW-SCORE USER ——1112

SELECT USER WITH HIGHEST TRUST SCORE AS HIGH-SCORE USER ——1114

C ——1126

INSTANTIATE KNOWLEDGE GRAPH OF ASSOCIATIONS BETWEEN LOW-SCORE USER AND HIGH-SCORE USER ——1116

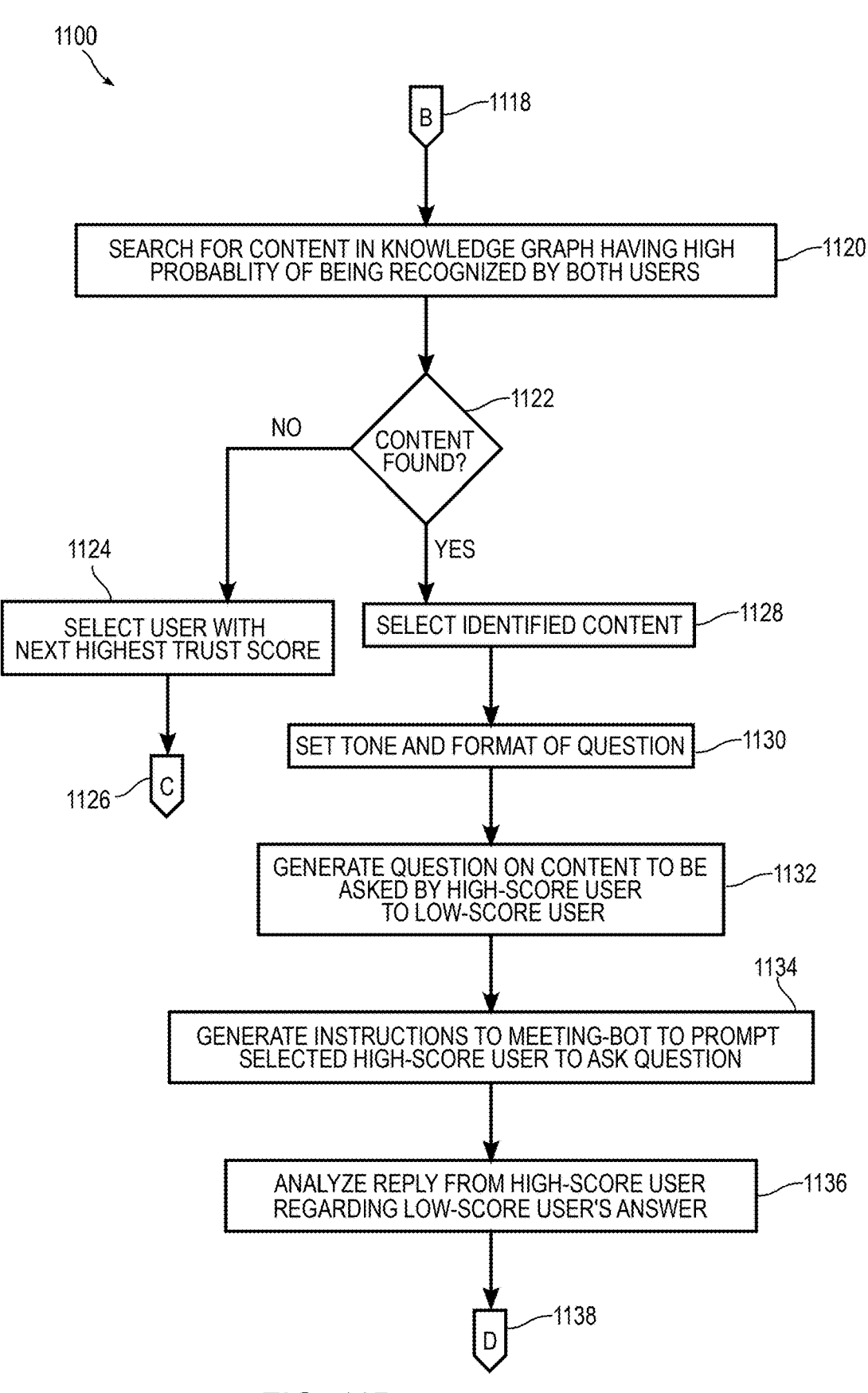

1100

B —1118

SEARCH FOR CONTENT IN KNOWLEDGE GRAPH HAVING HIGH PROBABLITY OF BEING RECOGNIZED BY BOTH USERS —1120

—1122
CONTENT FOUND?

NO

YES

1124
SELECT USER WITH NEXT HIGHEST TRUST SCORE

SELECT IDENTIFIED CONTENT —1128

1126 C

SET TONE AND FORMAT OF QUESTION —1130

GENERATE QUESTION ON CONTENT TO BE ASKED BY HIGH-SCORE USER TO LOW-SCORE USER —1132

1134
GENERATE INSTRUCTIONS TO MEETING-BOT TO PROMPT SELECTED HIGH-SCORE USER TO ASK QUESTION

ANALYZE REPLY FROM HIGH-SCORE USER REGARDING LOW-SCORE USER'S ANSWER —1136

SYSTEMS AND METHODS FOR REAL TIME DEEPFAKE IDENTIFICATION USING KNOWLEDGE GRAPHS IN VIRTUAL MEETINGS

BACKGROUND

Deepfakes are synthetic media created using artificial intelligence (AI) techniques, particularly deep learning algorithms. They manipulate audio, video, or images to depict people doing or saying things they never did. Using deepfakes, malicious actors could impersonate individuals, such as corporate executives or government officials, to gain unauthorized access to sensitive information or perform social engineering attacks. Thus, this technology raises concerns about misinformation, privacy violations, and its potential to deceive viewers, posing challenges for digital trust and authenticity in media and communication. On average, organizations spend roughly 15% of their time in meetings. Deepfakes, along with social engineering, have the potential to create a new, large attack surface in virtual meetings.

BRIEF DESCRIPTION OF DRAWINGS

Embodiments will be readily understood by the following detailed description in conjunction with the accompanying drawings. To facilitate this description, like reference numerals designate like elements. Embodiments are illustrated by way of example, and not by way of limitation, in the figures of the accompanying drawings. For convenience, if a collection of drawings designated with different letters are present (e.g., FIGS. 3A-3C), such a collection may be referred to herein without the letters (e.g., as "FIG. 3").

FIG. 10 is a simplified flow diagram of an example method for real time deepfake identification using knowledge graphs in virtual meetings according to some embodiments.

FIGS. 11A-11C are simplified flow diagrams of other example methods for real time deepfake identification using knowledge graphs in virtual meetings according to some embodiments.

DETAILED DESCRIPTION

Overview

Figure 1:
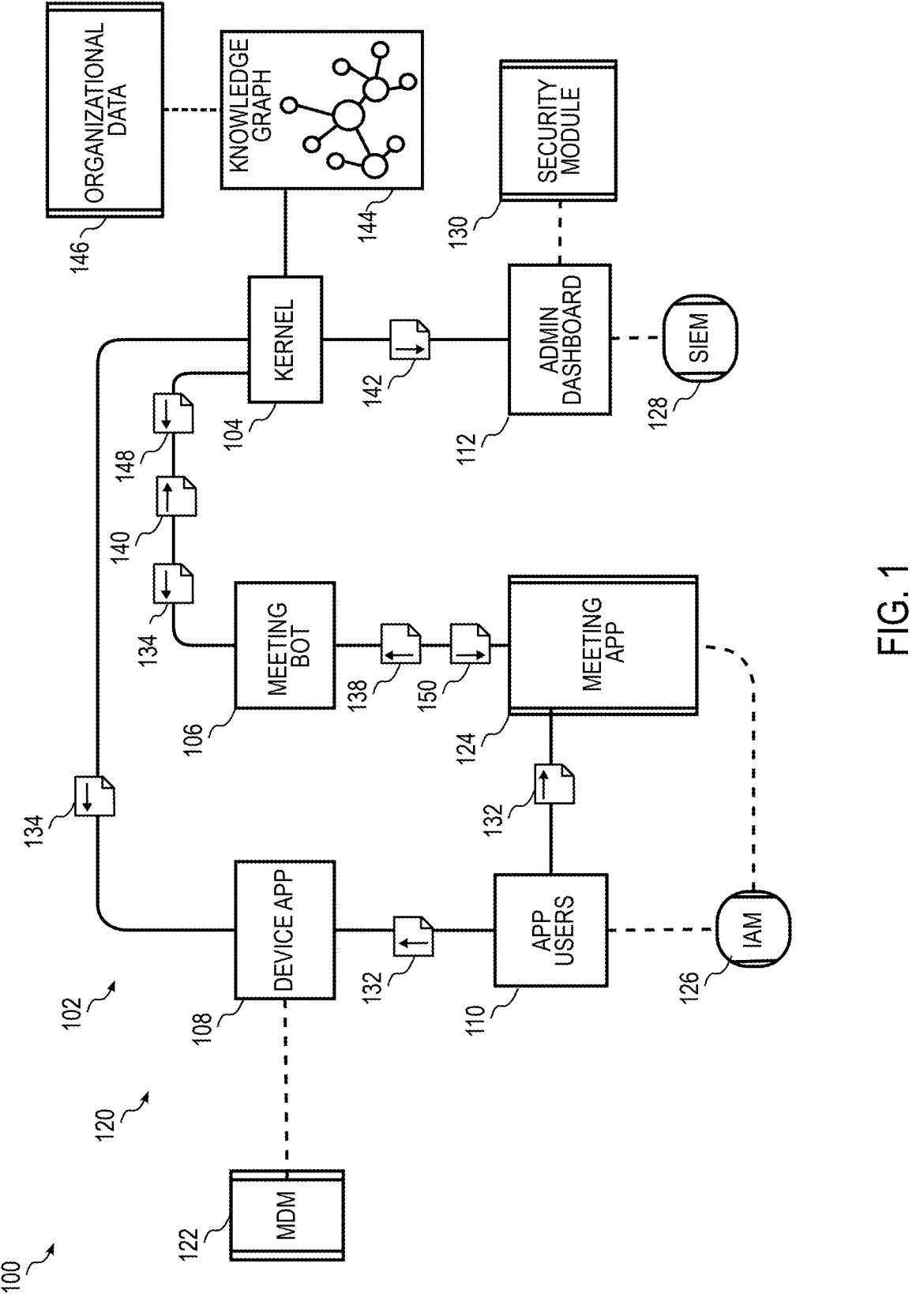
FIG. 1 is a simplified block diagram illustrating a system for real time deepfake identification using knowledge graphs in virtual meetings according to an example embodiment.

For purposes of illustrating the embodiments described herein, it is important to understand certain terminology and operations of enterprise technology. In the following detailed description, various aspects of the illustrative implementations may be described using terms commonly employed by those skilled in the art to convey the substance of their work to others skilled in the art.

The term "microphone" as used herein refers to any equipment that converts sound waves (i.e., acoustic energy) into electrical signals (i.e., electromagnetic energy), which can then be amplified, recorded, or transmitted wired or wirelessly. The microphone captures audio signals (i.e., sound waves) from sources such as voices, musical instruments, ultrasonic emitters, ambient sounds, etc.

The term "camera" as used herein refers to any equipment that captures and records electromagnetic signals having wavelengths between approximately 380 nanometers and 1 millimeter, for example, optical signals such as visual images or videos, and infrared radiation. The camera typically consists of a lens system that focuses the electromagnetic signals onto one or more of an optical sensor, infrared sensor, or a combination of optical and infrared sensors, which converts the incoming light into electronic signals that can be amplified, recorded, or transmitted wired or wirelessly.

The term "infrared" as used herein refers to electromagnetic radiation having wavelengths between approximately 700 nanometers and 1 millimeter. An infrared source is any equipment that generates infrared radiation (i.e., infrared signals). In some embodiments described herein, the infrared source comprises one or more of a solid-state electronic element that can be electrically excited to emit electromagnetic radiation in the wavelength range specified above. An example of an infrared source is a light emitting diode (LED) configured to emit light in the infrared wavelength range specified above; such LEDs may be referred to as infrared LEDs herein.

The term "ultrasonic" refers to sound waves having frequencies above approximately 20 kHz. An ultrasonic emitter is any equipment that emits ultrasonic sound (i.e., sound wave signals). Ultrasonic emitters may utilize piezoelectric materials such as quartz, ceramics or polymers configured into a transducer element, for example, by sandwiching between metal electrodes. Some devices such as a smartphone may be natively equipped with ultrasonic emitters that are used variously, for example, as proximity detectors, gesture recognition, etc.

The term "device" as used herein means a desktop computer, a laptop computer, a smartphone, a touch pad, a tablet computer, a notebook computer, an electronic gadget, or any device with a microprocessor, such as a central processing unit (CPU), general processing unit (GPU), or other such electronic component capable of executing processes of a software algorithm (such as a software program, code, application, macro, etc.).

The term "biometric" refers to measurable biological or behavioral characteristics of an individual such as heart rate, sweating rate, blood pressure, fingerprints, iris patterns, and voice patterns.

The term "module" refers to a software program, software tool, and/or algorithm that is to perform a particular function, execute a particular set of instructions, or may be comprised in a logical unit that may be distributed or localized in one or more hardware components. The module may include various circuitry and electronic components that facilitate the operations thereof. In this disclosure, the term "module" may be expressly stated, or may be implied based on functionality or operation of the associated component without departing from the scope of the embodiments.

The term "application" refers to a software program or a set of software tools to perform specific functions or tasks, providing users with tools and capabilities to accomplish various activities. It includes instructions encoded and stored in a suitable memory and in some cases, a frontend comprising a graphical user interface (GUI) that allows users to interact with the application through menus, icons, buttons, and other visual elements. The application may be distributed (e.g., stored and/or executing in different devices, processors, etc.) and accessed over a cloud network, or local (e.g., stored and/or executing in a single device or processor). The application may execute within a specific operating system (e.g., Windows™, macOS™, iOS™, Android™, etc.) or it may be web-based, accessible through a suitable web browser.

The term "connected" means a direct connection (which may be one or more of a communication, mechanical, and/or electrical connection) between the things that are connected, without any intermediary devices, while the term "coupled" means either a direct connection between the things that are connected, or an indirect connection through one or more passive or active intermediary devices.

The description uses the phrases "in an embodiment" or "in embodiments," which may each refer to one or more of the same or different embodiments.

Although certain elements may be referred to in the singular herein, such elements may include multiple sub-elements. For example, "a controller" may include one or more controllers.

Unless otherwise specified, the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

In the following detailed description, reference is made to the accompanying drawings that form a part hereof, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense.

The accompanying drawings are not necessarily drawn to scale. In the drawings, same reference numerals refer to the same or analogous elements shown so that, unless stated otherwise, explanations of an element with a given reference numeral provided in context of one of the drawings are applicable to other drawings where element with the same reference numerals may be illustrated. Further, the singular and plural forms of the labels may be used with reference numerals to denote a single one and multiple ones respectively of the same or analogous type, species, or class of element.

Note that in the figures, various components are shown as aligned, adjacent, or physically proximate merely for ease of illustration; in actuality, some or all of them may be spatially distant from each other. In addition, there may be other components, such as wires, cables, routers, switches, antennas, communication devices, etc. in the systems and networks disclosed that are not shown in the figures to prevent cluttering. Systems and networks described herein may include, in addition to the elements described, other components and services, including communication interfaces, microprocessors, microcontrollers, network management and access software, connectivity services, routing services, firewall services, content delivery networks, virtual private networks, etc. Further, the figures are intended to show relative arrangements of the components within their systems, and, in general, such systems may include other components that are not illustrated.

In the drawings, a particular number and arrangement of structures and components are presented for illustrative purposes and any desired number or arrangement of such structures and components may be present in various embodiments. Further, unless otherwise specified, the structures shown in the figures may take any suitable form or shape according to various design considerations, manufacturing processes, and other criteria beyond the scope of the present disclosure.

If a collection of reference numerals designated with different letters are present (e.g., 206A, 206B), such a collection may be referred to herein without the letters (e.g., as "206") and individual ones in the collection may be referred to herein with the letters. Further, labels in upper case in the figures (e.g., 206A) may be written using lower case in the description herein (e.g., 206*a*) and should be construed as referring to the same elements.

Various operations may be described as multiple discrete actions or operations in turn in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

The following foundational information may be viewed as a basis from which the present disclosure may be properly explained. Such information is offered for purposes of explanation only and, accordingly, should not be construed in any way to limit the broad scope of the present disclosure and its potential applications.

Virtual meetings or simply "meetings" are gatherings conducted over the internet using video conferencing technology, allowing users from different locations to interact in real time. Users connect remotely via video, and/or audio.

The meetings are typically implemented or facilitated through software platforms such as Zoom™, Microsoft Teams™, Google Meet™, Cisco Webex™, etc. Some meetings have a link or meeting credentials, allowing users to join at a scheduled time. Some virtual meetings are public, meaning anyone with the link or meeting credentials can join; whereas some virtual meetings are private, in that additional access credentials, such as a password, biometric credentials, etc., are needed to access the virtual meeting.

One of the concerns with virtual meetings is the growing menace of deepfakes, i.e., virtual imposters generated by artificial intelligence (AI). Deepfakes can convincingly alter faces, voices, and gestures of individuals in existing footage, creating realistic but fabricated content that can be difficult to distinguish from the genuine human in real time or in recordings. Deepfakes utilize AI to blend and superimpose existing images and videos onto source media, altering facial expressions, lip movements, and even voices. They can generate highly realistic simulations of individuals appearing to say or do things they did not, often convincingly mimicking real-life scenarios. Deepfakes can be used to spread false information, mislead viewers, or impersonate individuals in virtual meetings, compromising trust and credibility. Personal data and sensitive information shared in virtual meetings could be manipulated or misused through deepfake technology. Individuals or organizations could face reputational and other harm if deepfakes are used maliciously to create damaging content. The harm to trust, security and integrity is especially acute during virtual meetings within a trusted space, such as a company internal meeting, in which sensitive information such as trade secrets may be discussed in the presence of a deepfake user whose true identity is unknown.

Currently, combatting deepfake technology is a multi-pronged approach that involves a combination of detection tools, verification (e.g., authentication) tools, policy frameworks, and user education. Detection tools include forensic analysis and AI based solutions. Forensic analysis focuses on algorithms to analyze inconsistencies in facial movements, audio patterns, and other digital artifacts to detect manipulated content. AI and machine learning algorithms can be trained to distinguish between real and manipulated media by examining patterns and anomalies in data. Authentication techniques to overcome deepfakes focus on verifying the authenticity of digital content and detecting manipulated media. These techniques include using biometric data such as facial recognition or voice analysis, digital watermarking to embed verification marks, blockchain for immutable records, AI algorithms for anomaly detection, and implementing two-factor authentication for added security layers. These approaches aim to enhance digital trust and mitigate the risks associated with deepfake technology in media and communications.

Such techniques fall short in applications involving real time generation of deepfakes, such as in virtual meetings, in which one (or more) attendees may, in fact, be deepfake of authorized persons. In other words, the user in the virtual meeting is actually unauthorized, but may have illegally obtained access credentials of an authorized person and may be impersonating the authorized person using deepfake video and audio of the impersonated person. Some existing verification technologies may identify such deepfake video after the fact with high fidelity, but not in real time. Some multi-factor authentication (MFA) processes may try to increase authenticity of the access credentials by requiring the user to confirm their identity on a device other than the one they are using to login to the virtual meeting. However, such MFA processes can be inconvenient and disrupting to a genuine user, who may have placed the other device somewhere else, or who may now need to stop their login process, access the other device, obtain the authentication code and then resume their login process into the virtual meeting. Some other authentication processes require the user to use only authenticated (i.e., trusted) devices for participating in the virtual meeting; however, if the authenticated device is not available, or cannot be connected to the network, the user may be unable to participate in the virtual meeting.

Moreover, none of these authentication processes address deepfake scenarios in which the unauthorized user has obtained access to the virtual meeting by illegal means, circumventing the authentication steps in the first place. For example, the unauthorized user may have the authenticated device of the impersonated person or may have access to the authentication code received at another device of the impersonated person. An example scenario is a virtual job interview, in which the candidate has given their access credentials in their entirety to a fraudster who now attends the interview on their behalf as a deepfake. The hiring manager handling the interview, who has only previously seen a static photograph of the candidate and perhaps heard their voice on the phone, is not able to judge whether the user in the virtual interview is the actual candidate or a deepfake.

Accordingly, embodiments of systems and methods for real time deepfake identification using knowledge graphs in virtual meetings are disclosed herein. The systems and methods comprise an authentication application that uses AI. In a general sense, AI involves machine learning models that use algorithms to parse data, learn from the parsed data, and make informed decisions based on what has been learned. According to some classifications, deep learning models are subsets of machine learning models, being machine learning algorithms that operate in multiple layers, creating an artificial neural network. According to some other classifications, machine learning models are those that rely on human intervention to learn, whereas deep learning models automatically learn without human intervention. Because the learning algorithms are more relevant to the disclosure herein than any human intervention to provide training data, the former classification is employed herein, such that wherever "machine learning models" is used, it is intended that deep learning models are included as well.

Deep learning models in particular, enable AI algorithms such as generative AI models (e.g., ChatGPT™). In a general sense, AI algorithms have three qualities that differentiate them from other algorithms: intentionality, intelligence, and adaptability. As intentional algorithms, they make decisions, often using real-time data, combining information from a variety of different sources, analyzing the combined information instantly, and acting on insights derived from such data. As intelligent algorithms, they are capable of spotting patterns in underlying data. As adaptable algorithms, they learn and adapt their analyses based on shifting input data.

Recent advances in AI have made possible commercially available AI engines that expose application programming interfaces (APIs) for other applications to consume. In a general sense, the API is a set of rules and protocols that defines how two software systems may communicate with each other. AI APIs allow advanced AI capabilities of the AI engine to be integrated into applications by allowing the application to make requests to the API and receiving responses. Thus, these applications provide, through the API, data to the AI engine, which runs machine learning models on the data to give suitable results as requested by the applications. Different AI engines may use different machine learning models, thereby providing different results to the same input data.

An example method executed by an authenticating application facilitates identifying a deepfake in a virtual meeting of an organization using one or more knowledge graphs. A knowledge graph represents associations (e.g., networks, connections, relations, links, interdependences, etc.) of real-world entities, such as objects, events, situations or concepts. In other words, the knowledge graph is the application of a set of data (i.e., information) to an ontology (i.e., data model). The knowledge graph is made up of three main components: nodes, edges, and labels. The node is any ontological class, such as object, place, event, timeline, concept, person, etc. with particularized information. For example, a specific employee A in an organization can be a node of class "member"; a sales training in 2023 may be another node of class "training." The edge represents the relationship between the nodes. For example, the edge connecting nodes "A" and "sales training" may represent A's attendance as a trainer at the sales training. Labels comprise the attributes of nodes and edges. For example, the node representing class "member" has at least one label of "name;" the edge representing "attendance" has at least two labels of "trainer" and "trainee." The knowledge graph encompassed in various embodiments described herein may include any suitable ontology applied to any relevant data based on particular needs.

In some embodiments, the knowledge graph may be an enterprise knowledge graph, representing the organization's knowledge domain that is understood by both humans and machines. The enterprise knowledge graph represents the organization's knowledge assets, content, and data that leverages a data model specific to the organization to describe the people, places, and things and how they are related within the organization's context. In various embodiments, the knowledge graphs are instantiated (e.g., generated, created, etc.) using natural language processing (NLP) through semantic enrichment. Semantic enrichment identifies individual nodes from ingested data and establishes the edges between the different nodes. This working knowledge is then compared and integrated with other datasets, which are relevant and similar in nature, for example, another knowledge graph generated earlier in the timeline, or in another context. The completed knowledge graph allows question answering and search systems to retrieve and reuse comprehensive answers to given queries.

Using knowledge graphs presents an "out-of-band" channel for authentication, in addition to technology channels, such as MFA and human activity channels, such as manually clicking on a "I am not a robot" button on a webpage. In some embodiments, the authenticating application may calculate trust scores of users based on respective authentication steps completed for access to a virtual meeting. Responsive to determining that one of the trust scores is below a trust score threshold, the application may instantiate a knowledge graph representing known associations between the users. An AI engine may select content in the knowledge graph having a higher probability of being known to two users, one of the two having the low trust score. The AI engine may generate a question to be asked by the other user, the question comprising the content in a tone determined by a balancing algorithm that considers the organizational hierarchy of the two users. The response to the question by the user with the low trust score may be indicative of a likelihood of being a deepfake.

Embodiments of the authentication application disclosed herein may enable real time security and authenticity verification using knowledge graphs to differentiate deepfakes from a real human. The authentication application may be configured to suitably meet enterprise compliance and security standards. The authentication application may execute as a part of the enterprise's security system in some embodiments, using the enterprise's identity verification, authenticated-device management, security policies, etc. to provide a seamless user experience. The authentication application can enable trust by ensuring that users in the virtual meeting are who they claim to be so that virtual meetings are as good as in-person handshakes.

EXAMPLE EMBODIMENTS

FIG. 1 is a simplified block diagram illustrating a system 100 for real time deepfake identification using knowledge graphs in virtual meetings according to an example embodiment. An authentication application 102 includes a kernel 104, a meeting-bot 106, a device application 108, application user data 110, and an administrator dashboard 112. Authentication application 102 may interface with an enterprise security management 120, which may include various components, such as mobile device management (MDM) 122, a meeting application 124, an identity and access management (IAM) module 126, a security information and event management (SIEM) 128 and a security module 130. In various embodiments, meeting application 124 may comprise any suitable video conferencing technology that enables a virtual meeting to be conducted in a device, such as a laptop or smartphone.

In various embodiments, each block shown in the drawing may execute in a separate device in some embodiments; in other embodiments, some of the blocks may execute in a common device and others of the blocks may execute in a different device. In various embodiments, authentication application 102, in conjunction with enterprise security management 120 may enable authentication of a user in a virtual meeting hosted through (or by or in or using) meeting application 124. In various embodiments, authentication application 102 may enable real time identification of deepfakes in the virtual meeting. In the context of the embodiments described herein, "real time" refers to the ability of kernel 104 to process data from the virtual meeting and respond thereto substantially immediately as the processing occurs, without any noticeable delay to an average human user.

Enterprise security management 120 may allow only authenticated-devices, authenticated applications, and authenticated users to access various enterprise resources, such as meeting application 124 or virtual meetings conducted by meeting application 124. Note that as used herein, the term "meeting application" encompasses the virtual meeting that is conducted by the software application; in other words, the operations of meeting application 124 as embodied in the virtual meeting are included in the term "meeting application." Thus, as used herein, access to a virtual meeting implies access to meeting application 124 and vice versa. On the other hand, rejection or denial of access to the virtual meeting or meeting application 124 herein implies inability to participate in, or access, the specific virtual meeting executing in meeting application 124 to which the user has requested access. In some embodiments, rejection or denial of access to the virtual meeting does not result in denial of access to other functionalities of meeting application 124. In other embodiments, rejection or denial of access to the virtual meeting results in denial of access to all functionalities of meeting application 124.

MDM 122 may maintain registrations of authenticated devices through secure access credentials, or security containers in the devices, or such other authentication mechanisms. IAM 126 may maintain registrations of authenticated users through secure access credentials. SIEM 128 may maintain a running list of events and information that pose security concerns to the enterprise. Security module 130 may be used to configure various features of enterprise security management 120. Within such enterprise security management 120, authentication application 102 may comprise an authenticated application (e.g., resource), allowed to access the authenticated devices, communicate with authenticated users and/or verify their access credentials, use enterprise resources such as meeting application 124, and provide reports to SIEM 128 and/or security module 130.

In various embodiments, enterprise users (i.e., humans) may be authorized to access enterprise resources such as meeting application 124 using suitable access credential 132. IAM 126 may manage such enterprise resources and associated access credential 132. Certain devices associated with the enterprise users may also be authenticated based on access credential 132. In some embodiments, access credential 132 for accessing enterprise resources may be same as access credential 132 for authenticating devices; in other embodiments, access credential 132 may be different for enterprise resources and authenticated devices. Access credential 132 may comprise username and password, passkey, face identifier (Face ID), MFA, biometric login, and any other type of access credentials without departing from the scope of the embodiments. MDM 122 may authenticate devices appropriately and manage such authenticated-devices and associated access credential 132. MDM 122 and IAM 126 may provide kernel 104 with relevant information associated with enterprise resources, authenticated devices and access credentials of enterprise users.

Device application 108 may be allowed to access the authenticated-device's hardware components, such as ultrasonic transmitters or device speakers, or infrared transmitters or sensors, to cause the hardware components to generate and emit ultrasonic or infrared signals according to instructions 134 from kernel 104. In some embodiments, device application 108 may also monitor (e.g., listen to, collect, etc.) biometric data recorded or received by the authenticated-device and associated with the human who is authorized to access the enterprise resources. For example, the device may be linked to a wearable monitor that measures, records and transmits biometric data such as heart rate, blood pressure, etc., of the human who is wearing the monitor. Device application 108 may access biometric data based on particular needs, permissions, settings, etc. In some embodiments, device application 108 may be constantly active in the authenticated device; in some other embodiments, device application 108 may be instantiated upon receiving instructions 134 from kernel 104. Device application 108 may require separate access credentials managed by kernel 104 in some embodiments. In other embodiments, access to device application 108 may be managed by IAM 126. In some such embodiments, access to enterprise resources may allow the user access to device application 108 also.

Meeting-bot 106 may be installed in meeting application 124 and/or instantiated when meeting application 124 is opened in system 100. Meeting-bot 106 may monitor meeting application 124 by listening to and collecting data received at meeting application 124. In some embodiments, meeting-bot 106 may access the device on which meeting application 124 is executing and cause the device to emit ultrasonic or infrared signals according to instructions 134 from kernel 104. Note that meeting application 124 may execute in an authenticated device installed with device application 108 or in any other device without departing from the scope of the embodiments. Meeting-bot 106 may access such device irrespective of the device's authenticated status within enterprise security management 120. Meeting-bot 106 may collect data 138 from meeting application 124, such data 138 including audio data (including audible and inaudible sounds), visual data and infrared data, and send the collected data, timestamped with the time of collection as timestamped data 140, to kernel 104. Kernel 104 may send report 142 to administrator dashboard 112. Report 142 may include data about various risk events, mitigation measures, etc. of relevance to SIEM 128 and security module 130. In some embodiments, kernel 104 may communicate with meeting application 124 directly, for example, to push notifications or reports based on particular needs.

In various embodiments, system 100 may include a knowledge graph 144 generated from organizational data 146. Kernel 104 may generate and send instructions 148 to meeting-bot 106. Instructions 148 may include one or more questions to be asked of a selected subset of users in the meeting. Meeting-bot 106 may open a chat 150 in meeting application 124 directed to the selected subset of users and ask the one or more questions according to instructions 148 in chat 150. Chat 150 may include a call to action (CTA) prompting the chat user to act to allow or reject the suspected deepfake in the virtual meeting. The response to the CTA may be included in data 138 sent by meeting-bot 106 to kernel 104. In some embodiments, one question may be selected for asking by one user to the suspected deepfake, and if the suspected deepfake is verified to be authentic by the selected user, the process may terminate suitably without requiring any other user to ask any more questions of the suspected deepfake. Such a process may be tailored suitably using a balancing algorithm to minimize unnecessary disruptions, loss of trust, personnel conflicts, or other negative consequences.

During operation, in an example embodiment, when a user accesses meeting application 124 using access credential 132, kernel 104 may query its internal database and find the authenticated device that is linked to access credential 132. Kernel 104 may thereafter determine the address of device application 108 installed on the authenticated device. Kernel 104 may generate a cryptographic key and instructions 134 to generate an ultrasonic or infrared signal encoding the cryptographic key. In some embodiments, the cryptographic key is a random number.

Kernel 104 may send instructions 134 to device application 108 at the address or to meeting-bot 106; instructions 134 enable the authenticated device, or the device in which meeting application 124 is executing, to generate and emit the ultrasonic or infrared signal. If the authenticated-device is close to the user, the ultrasonic or infrared signal is mixed with audible or electromagnetic signals, as applicable, from the user or the user's environment and picked up by a microphone or infrared sensors, as applicable, to appear in data 138 collected by meeting-bot 106. The microphone and infrared sensors may be connected to or integrated with either (or both) the authenticated device in which device application 108 is executing or the device in which meeting application 124 is executing.

Meeting-bot 106 may collect data 138, tag it with the access credentials of the user, timestamp the time of collection, and send timestamped data 140 to kernel 104. Kernel 104 may identify the ultrasonic or infrared signal in the audio or electromagnetic data, extract the cryptographic key therefrom, compare it to the previously generated cryptographic key and authenticate the user as a human when there is a match. A match may not be found when the audio or video data from the microphone is manipulated before being sent to meeting application 124, such as in a deepfake scenario.

Completion of the authentication step may result in a trust score being assigned to the user. If the match is found, the resulting trust score T1 is higher than trust score T2 if the match is not found. In various embodiments, other types of authentication mechanisms may also be used to assign trust scores. For example, the user may log into meeting application 124 using a username and password with MFA. Such an authentication step may be assigned another trust score, say T3 if it is completed successfully and T4 if it is not completed successfully. T3 may be higher than T4. Further, T1 may be higher than T3 because the authentication step using cryptographic keys as described herein may be more trustworthy than authenticating with MFA. In yet another scenario, the user may log into meeting application 124 using a username and password without MFA. Such an authentication step may be assigned yet another trust score, say T5 if it is completed successfully and T6 if it is not completed successfully. T5 may be higher than T6. Further, T3 may be higher than T5 because the authentication step with MFA is more trustworthy than the authentication step without MFA. A comparison of the trust scores from the various authentication steps described so far may be as follows: T1>T3>T5>T2>T3>T4. Various other authentication steps may be assigned corresponding trust scores based on the type of authentication step, whether it was completed successfully, and any other factor that may be relevant to determining the trust score.

If the trust score of any user is below a predetermined trust score threshold, the user may be flagged as a potential deepfake. Responsive to determining that at least one of the trust scores is below the trust score threshold, authentication application 102 may instantiate, from organizational data 146, knowledge graph 144 representing known associations between the users. An AI engine executing in kernel 104, or outside system 100 and accessed through a suitable API by kernel 104, may select content in the knowledge graph having a higher probability of being known to two users, one of the two having the low trust score. The AI engine may generate a question to be asked by the other user, i.e., the user with the higher trust score also called herein the "high-score user," the question comprising the content in the knowledge graph, in a tone determined by a balancing algorithm that considers the organizational hierarchy of the two users. The reply to the question by the low-score user may be indicative of a likelihood of being a deepfake.

In some embodiments, responsive to a reply from the high-score user that the low-score user's answer to the question is not satisfactory, kernel 104 may push alerts and/or notifications to be published in meeting application 124. In some embodiments, kernel 104 may also send to the low-score user, one or more alternate authentication steps for entry to the virtual meeting, or may prevent entry of the low-score user to the virtual meeting, or may terminate the virtual meeting. Such actions may be preconfigured in kernel 104 or may be set in security policies by IAM 126. Various other security measures may be undertaken without departing from the scope of the embodiments. In various embodiments, kernel 104 may send reports 142 to admin-istrator dashboard 112 and/or meeting application 124 via meeting-bot 106 according to a predetermined schedule or upon request.

Figure 2:
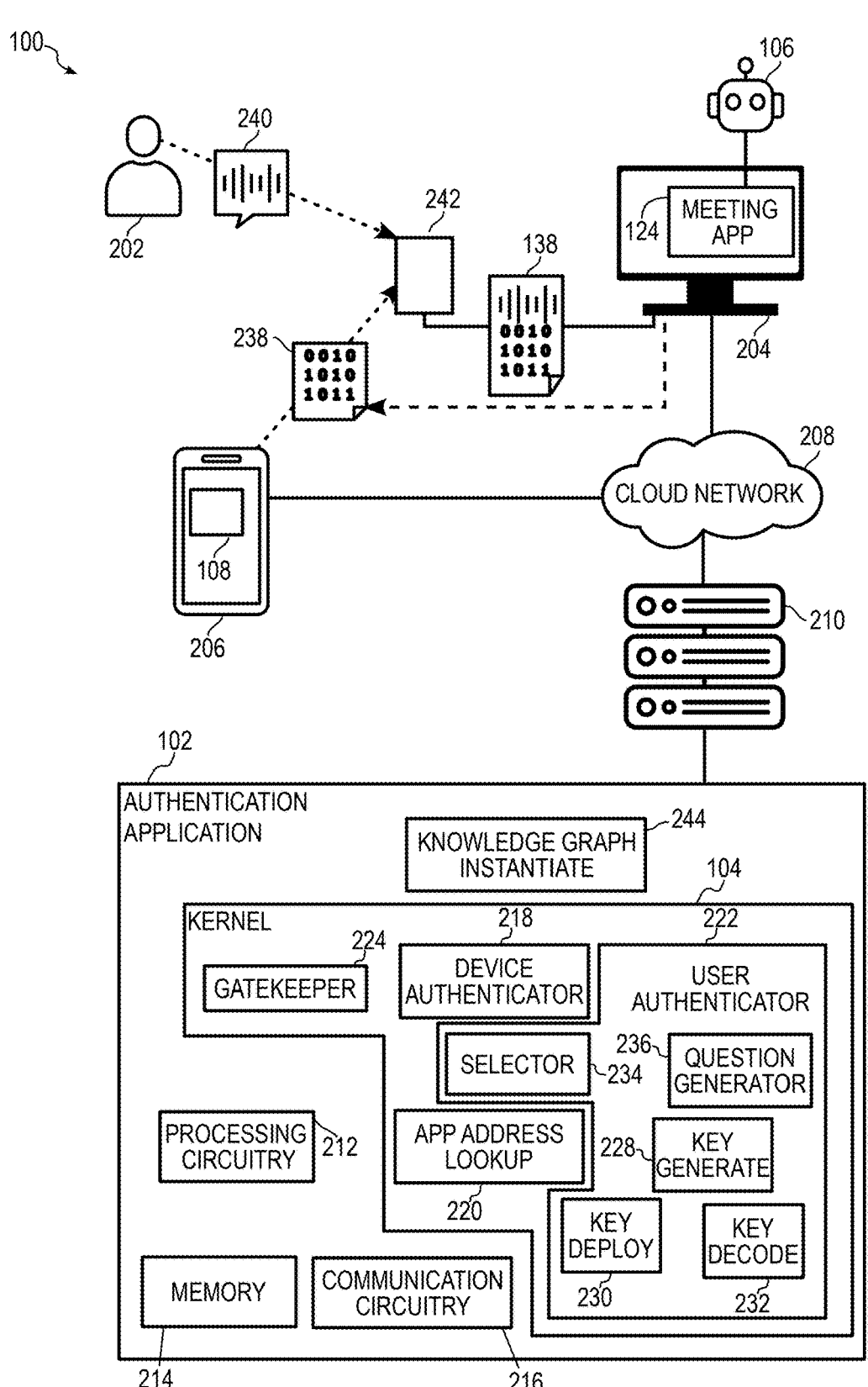
FIG. 2 is a simplified diagram illustrating various details of the system for real time deepfake identification using knowledge graphs in virtual meetings according to an example embodiment.

FIG. 2 is a simplified diagram illustrating various details of system 100 according to an example embodiment. As shown in FIG. 2, a user 202 may desire to access meeting application 124 executing in device 204. User 202 refers to a human user in authentic cases. In deepfake scenarios, user 202 may be software imitating the human user. User 202 may be associated with a trusted-device 206 in which device application 108 is installed. In the example shown, trusted-device 206 in which device application 108 executes is different from device 204 in which meeting application 124 executes. In other examples, device 204 and trusted-device 206 may be the same; i.e., device application 108 and meeting application 124 may be installed and/or execute in the same device (e.g., device 204 or trusted-device 206). In examples where device 204 and trusted-device 206 are different, device 204 may or may not be authenticated or otherwise associated with user 202 within the broad scope of the embodiments.

Note that trusted-device 206 may be authenticated and managed by MDM 122 within enterprise security manage-ment 120. In some embodiments, meeting application 124 is installed only in such authenticated devices. In some other embodiments, any device in which device application 108 is installed may be trusted, because device application 108 allows control of certain functionalities and hardware com-ponents of the device by authentication application 102 within the scope of the embodiments described herein. Device 204 may be, but need not be, authenticated by MDM 122 within the broad scope of the embodiments herein. Different labels are given to devices 204 and 206 herein merely for ease of explanation and not as a limitation.

Device 204 and trusted-device 206 may be coupled to authentication application 102 over a cloud network 208. In various embodiments, authentication application 102 may be implemented in one or more servers 210 in cloud network 208. Certain portions of authentication application 102 may execute using a processing circuitry 212, a memory 214 and communication circuitry 216 (among other components) in one or more servers 210. In some embodiments, one or more of the features of authentication application 102 may be implemented in hardware, provided external to these ele-ments, or consolidated in any appropriate manner to achieve the intended functionality. The various network elements in system 100 may include communication software that can coordinate to achieve the operations as outlined herein. In still other embodiments, these elements may include any suitable algorithms, hardware, software, components, mod-ules, interfaces, or objects that facilitate the operations thereof.

Processing circuitry 212 may execute any type of instruc-tions associated with data stored in memory 214 to achieve the operations detailed herein. In one example, processing circuitry 212 may transform data from one state or thing to another state or thing. In another example, the activities outlined herein may be implemented with fixed logic or programmable logic (e.g., software/computer instructions executed by a processor) and the elements identified herein could be some type of a programmable processor, program-mable digital logic (e.g., field programmable gate array (FPGA), an erasable programmable read only memory (EPROM), an application specific integrated circuit (ASIC)) that includes digital logic, software, code, electronic instruc-tions, flash memory, optical disks, magnetic or optical cards, other types of machine-readable mediums suitable for storing electronic instructions, or any suitable combination thereof.

In some of example embodiments, one or more memory 214 may store data used for the operations described herein. This includes memory 214 storing instructions (e.g., software, logic, code, etc.) in non-transitory tangible media (e.g., random access memory (RAM), read only memory (ROM), FPGA, EPROM, etc.) such that the instructions are executed to carry out the activities described in this disclosure based on particular needs. In some embodiments, memory 214 may comprise non-transitory computer-readable tangible media, including one or more memory devices such as volatile memory such as dynamic RAM (DRAM), nonvolatile memory (e.g., ROM), flash memory, solid-state memory, and/or a hard drive. In some embodiments, memory 214 may share a die with processing circuitry 212. Memory 214 may include algorithms, code, software modules, and applications, which may be executed by processing circuitry 212. The data being tracked, sent, received, or stored in system 100 may be provided in any database, register, table, cache, queue, control list, or storage structure, based on particular needs and implementations, all of which could be referenced in any suitable timeframe.

Communication circuitry 216 may be configured for managing wired or wireless communications for the transfer of data in system 100. The term "wireless" and its derivatives may be used to describe circuits, devices, systems, methods, techniques, communications channels, etc., that may communicate data through modulated electromagnetic radiation in a nonsolid medium. The term does not imply that the associated devices do not contain any wires, although in some embodiments they might not. Communication circuitry 216 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long Term Evolution (LTE) project along with any amendments, updates, and/or revisions (e.g., advanced LTE project, ultramobile broadband (UMB) project (also referred to as "3GPP2"), etc.). Communication circuitry 216 may operate in accordance with a Global System for Mobile Communication (GSM), General Packet Radio Service (GPRS), Universal Mobile Telecommunications System (UMTS), High-Speed Packet Access (HSPA), Evolved HSPA (E-HSPA), or LTE network. Communication circuitry 216 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). Communication circuitry 216 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. Communication circuitry 216 may operate in accordance with other wireless protocols in other embodiments. Communication circuitry 216 may include antennas to facilitate wireless communications and/or to receive other wireless communications.

In some embodiments, communication circuitry 216 may manage wired communications, such as electrical, optical, or any other suitable communication protocols (e.g., the Ethernet, Internet). Communication circuitry 216 may include multiple communication chips. For instance, a first communication chip may be dedicated to shorter-range wireless communications such as Wi-Fi or Bluetooth, and a second communication chip may be dedicated to longer-range wireless communications such as global positioning system (GPS), EDGE, GPRS, CDMA, WiMAX, LTE, EV-DO, or others. In some embodiments, a first communication chip may be dedicated to wireless communications, and a second communication chip may be dedicated to wired communications.

The example network environment may be configured over a physical infrastructure that may include one or more networks and, further, may be configured in any form including, but not limited to, local area networks (LANs), wireless local area networks (WLANs), virtual local area networks (VLANs), metropolitan area networks (MANs), wide area networks (WANs), virtual private networks (VPNs), Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a WANs (e.g., the Internet).

In various embodiments, kernel 104 may include a device authenticator 218; an application address-lookup module 220; a user authenticator 222; and a gatekeeper 224. User authenticator 222 may include a key-generate module 228; a key-deploy module 230; a key-decode module 232; a selector 234 and a question generator 236. Device authenticator 218 may find trusted-device 206 that is linked to access credential 132 of user 202. Application address-lookup module 220 may thereafter determine the address of device application 108 installed in trusted-device 206. Key-generate module 228 may generate a cryptographic key. The cryptographic key may comprise a random number in some embodiments. In other embodiments, the cryptographic key may be a fixed-size output generated by a hash function. Various other types of cryptographic keys may be used within the broad scope of the embodiments.

Key-deploy module 230 may create instructions 134 (not shown to prevent clutter) to cause trusted-device 206 or device 204 to generate a key-signal 238, which may comprise an ultrasonic signal or an infrared signal, encoding the cryptographic key. In some embodiments, key-signal 238 may comprise discrete or continuous time-varying ultrasonic sound waves at one or more frequencies that corresponds to the cryptographic key. For example, key-signal 238 may comprise a sequence of sound pulses at two different frequencies, each frequency corresponding to either 0 or 1. Various other mechanisms to encode the cryptographic key using ultrasonic signals may be included within the broad scope of the embodiments. In some other embodiments, key-signal 238 may comprise discrete or continuous time-varying infrared waves at one or more frequencies that corresponds to the cryptographic key. For example, key-signal 238 may comprise a sequence of electromagnetic pulses at two different frequencies in the infrared frequency range, each frequency corresponding to either 0 or 1. Various other mechanisms to encode the cryptographic key using infrared signals may be included within the broad scope of the embodiments.

Key-deploy module 230 may send instructions 134 to device application 108 or meeting-bot 106. Instructions 134 may cause trusted-device 206 or device 204 to generate and emit key-signal 238. User 202 and/or the ambient environment around user 202 may generate one or more audible or electromagnetic return signal 240. Return signal 240 comprises sound waves at frequencies audible to the human ear in some embodiments. In some other embodiments, return signal 240 comprises electromagnetic waves in the visible and infrared range. Key-signal 238 may mix with return signal 240 and be picked up by a collecting-device 242 associated with meeting application 124 executing in device 204. In some embodiments, collecting-device 242 may be a microphone. In some other embodiments, collecting-device 242 may be a camera. In yet other embodiments, collecting-device 242 may comprise infrared sensors. Collecting-device 242 may send the collected signals as data 138 to meeting application 124.

Collecting-device 242 is shown as separate from device 204 merely for ease of explanation. In various embodiments, collecting-device 242 may be integrated into device 204 (e.g., contained within a housing, envelope, or chassis thereof), or included in a stand-alone equipment connected to device 204, for example, wirelessly (e.g., Bluetooth, Wireless-Fidelity (WiFi), etc.) or by wires. Collecting-device 242 may be a dedicated equipment (e.g., having a single main functionality, such as a listening functionality) or may be integrated with or within equipment that has other functionalities (e.g., equipment having microphone and camera integrated together). Collecting-device 242 described in the various embodiments herein may be integrated with or within any equipment suitably based on particular needs even when the manner of such integration is not mentioned with specificity.

Note that meeting application 124 may receive key-signal 238 and return signal 240 from multiple users 202 who have accessed meeting application 124 using separate access credentials. In some embodiments, meeting-bot 106 may tag data 138 with access credential 132 of associated user 202 using capabilities of meeting application 124 suitably to identify the source of specific data 138. Various means of associating data 138 with access credential 132 of user 202 may be used by meeting-bot 106 without departing from the scope of the embodiments. In various embodiments, meeting-bot 106 may aggregate data 138 from substantially all users 202 who have accessed meeting application 124 with respective access credential 132; the aggregated data 138 may comprise separate subsets tagged respectively according to access credential 132 of corresponding users 202.

Meeting-bot 106 may timestamp data 138 and send timestamped data 140 (not shown to prevent clutter) to authentication application 102 over cloud network 208. Key-decode module 232 may disaggregate the received data, separating individual sets according to respective tagged access credential 132. Key-decode module 232 may extract the cryptographic key encoded in return signal 240 from the relevant subset of timestamped data 140 and compare with the cryptographic key previously generated by key-generate module 228 for that access credential 132. Depending on whether there is a match, selector 234 may assign a trust score to user 202. In other words, if there is a match, a trust score, say T20, may be assigned to user 202; if there is no match, another trust score, say T21, may be assigned to user 202. In some embodiments, T21 may be less than T20. Selector 234 may rank the trust scores of multiple users 202 who are attempting to gain entry to the virtual meeting in meeting application 124.

If at least one trust score is found to be lower than a predetermined trust score threshold, further actions may be performed. Selector 234 may select one or more users with a higher trust score and provide the names or other identifying information of the low-score user (i.e., user 202 having a trust score lower than the predetermined trust score threshold) and high-score users (i.e., users 202 having trust scores higher than the predetermined trust score threshold) to a knowledge graph instantiate module 244. Knowledge graph instantiate module 244 may instantiate knowledge graph 144. In some embodiments, knowledge graph 144 may be newly instantiated (i.e., not generated from a previous or existing knowledge graph by cloning, copying, cutting, etc.) In some other embodiments, knowledge graph 144 may be instantiated as a subset of an already existing knowledge graph. Knowledge graph 144 may represent associations between the high-score users and the low-score user. Certain content in knowledge graph 144 may be identified as having a high probability of being familiar to the low-score user and one of the high-score users. Selector 234 may select such content and feed it to question generator 236, which may generate a suitable question to be asked by the selected high-score user to the low-score user. The question's format and tone may be set by a balancing algorithm that considers natural human interaction styles, authority gaps, cultural gaps and other such information relevant to an appropriate conflict-free interaction between the selected high-score user and the low-score user based on preconfigured settings and information gleaned from knowledge graph 144.

Question generator 236 may send instructions 148 to meeting-bot 106 to prompt the selected high-score user to ask the question of the low-score user. Meeting-bot 106 may open chat 150 in meeting application 124 with the selected high-score user and request the high-score user to ask the question. Responsive to the high-score user's reply whether the answer by the low-score user is satisfactory, certain actions may be triggered. In some embodiments, if the answer by the low-score user is satisfactory to the high-score user, gatekeeper 224 may allow the low-score user access to the virtual meeting in meeting application 124. On the other hand, if the answer by the low-score user is not satisfactory to the high-score user, the low-score user may be classified as unauthenticated and further security actions may be taken by gatekeeper 224, such as denying access to meeting application 124. These steps may be repeated for as many low-score users as are identified in the virtual meeting in some embodiments.

Note that various modules are shown in the figure but are not labeled as modules merely for ease of illustration and to prevent clutter, and not as a limitation. Also, some words are shown in the figure is shortened form (e.g., "app" for "application") or without hyphens merely to prevent clutter.

Figure 3:
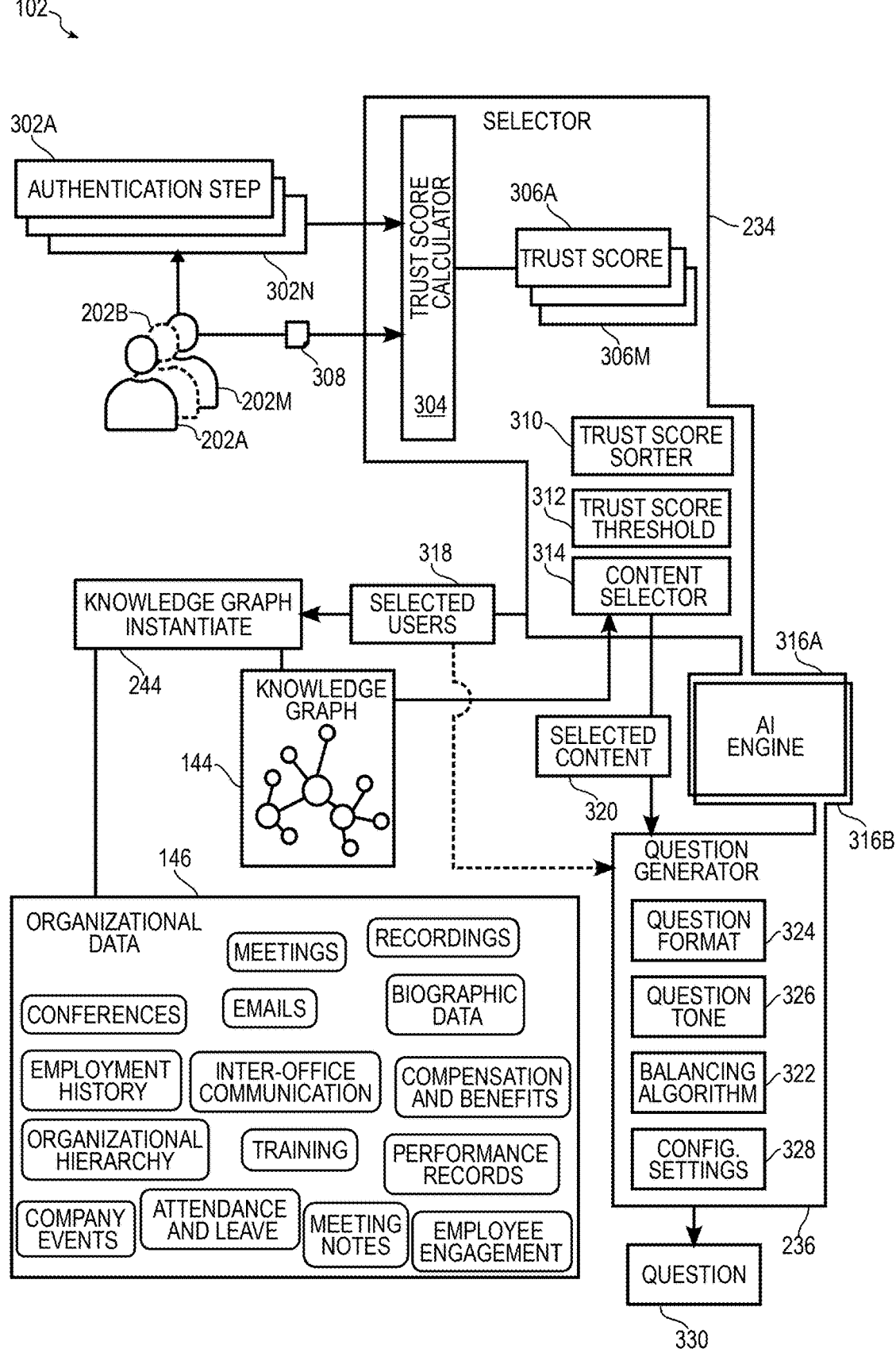
FIG. 3 is a simplified block diagram illustrating additional details of the system for real time deepfake identification using knowledge graphs in virtual meetings according to an example embodiment.

FIG. 3 is a simplified block diagram illustrating additional details of authentication application 102 within the broad scope of the embodiments. Two or more users 202a-202m may attempt to access meeting application 124 using one or more authentication step 302, for example, 302a-302n. Each authentication step 302 may comprise a different type of authenticating means. For example, authentication step 302a may comprise the cryptographic key method described in reference to previous figures; authentication step 302b may comprise a login using MFA; authentication step 302c may comprise another login without MFA; yet another authentication step 302d may comprise login with biometric data; and so on. Any type of authenticating means may be included in authentication step 302 within the broad scope of the embodiments. In some embodiments, user 202a may use authentication step 302a; other users 202b-202m may use authentication step 302b; and so on. In some other embodiments, all users 202a-202m may use the same authentication step 302, such as 302a. In yet other embodiments, no one user 202 may use the same authentication step 302 as any other user 202. Some users 202 may complete more than one authentication step 302, for example, 302a and 302b. Any such variations thereof are included within the broad scope of the embodiments.

A trust score calculator 304 in selector 234 may calculate and/or otherwise assign a trust score 306 to corresponding user 202 according to the respective authentication step 302 used. The assignation may be based on preconfigured settings in some embodiments. For example, a cryptographic authentication means may be assigned trust score 306 of T1 if it is completed successfully and T2 if it is not completed successfully; MFA authentication means may be assigned trust score 306 of T3 if it is completed successfully and T4 if it is not completed successfully; and so on. Thus, each user 202a-202m may be assigned a corresponding trust score 306a-306m based on the authentication step 302 completed.

In some embodiments, if all trust scores 306 are the same, for example, when users 202a-202m successfully complete the same authentication step 302, additional factors may be used to differentiate among trust scores 306. For example, trust score 306 of users 202 may be additionally based on their settings in IAM 126 (e.g., more highly trusted devices used to complete authentication step 302 may be assigned higher trust scores), or risk to the organization if user 202 is deepfake; and so on. In some embodiments, any of users 202a-202m may provide input 308, for example, in the form of a comment in a chat window to meeting-bot 106, or a voice input in the virtual meeting, that another user 202 is suspected to be a deepfake. Trust score calculator 304 may analyze input 308 (e.g., by parsing the text or voice, performing a semantic analysis to understand the meaning of the text or voice, etc.) and based on the analysis, assign a low trust score 306 to the suspected deepfake.

Assume, merely for example purposes, that user 202b is a suspected deepfake with lowest trust score 306b. A trust score sorter 310 in selector 234 may sort and rank trust scores 306a-306m and determine that trust score 306b is the lowest. In some embodiments, all other trust scores 306a, 306c-306m may be the same or may have variations among them, in which case, trust score sorter 310 may sort accordingly. In some embodiments, trust score sorter 310 may also compare trust scores 306a-306m against a trust score threshold 312. Any trust score 306a-306m that is lower than trust score threshold 312 may be classified automatically as suspected deepfake, inauthentic, etc. Trust score threshold 312 may be a preconfigured setting in some embodiments. In other embodiments, trust score threshold 312 may be set based on trust score 306 of the last identified and verified deepfake in system 100. Various other means for setting trust score threshold 312 may be used within the broad scope of the embodiments.

Selector 234 may thereafter select another user 202a having trust score 306a higher than the lowest trust score 306b. In some embodiments, user 202a so selected may have the highest trust score 306a among all users 202a-202m. In some other embodiments, user 202a may be randomly selected from among a plurality of users 202 (e.g., a subset of users 202a-202m) having the same value of trust score 306a. In yet another embodiment, user 202a may be any one other than user 202b, who has the lowest trust score 306b.

Having identified users 202a and 202b as a high-score user and a low-score user, respectively, selector 234 may collate identifying information about them, such as access credentials used to access meeting application 124, or names, or other identifiers, into selected users 318. In some embodiments, selector 234 may access IAM 126 to identify and retrieve the names of high-score user 202a and low-score user 202b. Selector 234 may send selected users 318 to knowledge graph instantiate module 244. Knowledge graph instantiate module 244 may instantiate knowledge graph 144 comprising known associations between users 202a and 202b identified in selected users 318. In some embodiments, knowledge graph 144 may be instantiated anew from organizational data 146; in other embodiments, knowledge graph 144 may be instantiated as a subset of an already existing knowledge graph that was created previously from organizational data 146 and stored in a graph database.

Organizational data 146 may include various data from a variety of sources. Examples of data sources for organizational data 146 include document management systems, digital asset management systems, human resources systems and/or databases, learning and development systems and/or databases, customer relationship management systems, and communication systems such as e-mail and text systems and repositories. The data may be stored in the same or different databases, the same or different locations. The data may be stored in databases, data lakes, data stores, etc., structured or unstructured, in any suitable format, as based on particular needs. Examples of data included in organizational data 146 include: information on conferences attended by members of the organization; meetings held in the organization; recordings of meetings and conferences; meeting notes; training; company events; emails; inter-office communications such as by letters, memos, posters, or texts (e.g., Slack™, Teams™, etc.); employee data such as biographic data, compensation and benefits, performance records, employee engagement, employment history within the organization; organizational hierarchy and such other data that is not subject to privacy concerns or other legal restrictions for use within the organization. In various embodiments, organizational data 146 may be updated in real time, such that any knowledge graph 144 generated therefrom is also updated in real time.

A content selector 314 may analyze knowledge graph 144 and identify content therein that has a high probability of being known to users 202a and 202b. Content selector 314 may use an AI engine 316a to identify such content. AI engine 316a may have been previously trained on organizational data 146 and/or other ones of knowledge graph 144 to calculate such probabilities. In some embodiments, knowledge graph 144 and selected users 318 may be fed to AI engine 316a with a prompt to identify content known to users 202a and 202b.

If no content can be identified, selector 234 may remove information of user 202a from selected users 318, and choose another user, say user 202m, who has a next highest trust score 306 and provide the identifier of such user as one of selected users 318. Knowledge graph instantiate module 244 may instantiate another knowledge graph 144 representing known associations between users 202m and 202b; content selector 314 may identify content in knowledge graph 144 that has a high probability of being known to users 202m and 202b. The process may continue until some (i.e., non-zero, non-null, etc.) content in knowledge graph 144 is selected and categorized as selected content 320.

Assume merely for example purposes that selected users 318 comprises information about users 202*a* and 202*b*; and selected content 320 comprises meeting notes of a one-on-one meeting between user 202*a* and 202*b* two weeks prior. Selected content 320 and corresponding selected users 318 may be provided to question generator 236. A balancing algorithm 322 in question generator 236 may determine a question format 324 and a question tone 326 based at least on the organizational hierarchy of users 202*a* and 202*b* and on a plurality of factors such as preconfigured settings in configuration settings 328. Question generator 236 may generate a question 330 based on at least a portion of selected content 320 using question format 324 and question tone 326 determined by balancing algorithm 322.

For example, selected content 320 may include a factoid about a new gadget that user 202*b* showed user 202*a* during the one-on-one meeting; the generated question may be "Remember the new gadget you showed me during our one-on-one meeting two weeks ago? Can you recall what that was?" In various embodiments, question format 324 and question tone 326 may represent natural interaction appropriate between users 202*a* and 202*b*, considering their relative authority gap (e.g., user 202*b* may be a supervisor of user 202*a*), cultural gap (e.g., users 202*a* and 202*b* may be from different demographics); etc. The factors to be used in determining question format 324 and question tone 326 may be preconfigured in configuration settings 328. In some embodiments, the attributes may be tailored to minimize (e.g., reduce) potential conflict or negative reactions in the event that user 202*b* is not a deepfake and perceives question 330 from user 202*a* as rude or inappropriate. For example, question tone 326 used between peers in an organization may be different than question tone 326 used between a supervisor and a person who reports to him or her in the organization. In another example, certain words may be offensive in certain cultural contexts and question format 324 may be tailored to consider such cultural nuances. Balancing algorithm 322 may apply the attributes to information gleaned from knowledge graph 144 to determine question format 324 and question tone 326. In some embodiments, an AI engine 316*b* may be trained to determine question format 324 and question tone 326 from information in knowledge graph 144 using balancing algorithm 322.

In some embodiments, AI engine 316*a* and 316*b* may be the same; in other embodiments, they may be different. In some embodiments, the training data used by AI engine 316*a* and AI engine 316*b* may be identical whereas the prompts, features and labels may be different. In some other embodiments, the training data, prompts, features, and labels may all be different for AI engine 316*a* and AI engine 316*b*. Various such configurations are included within the broad scope of the embodiments. In some embodiments, AI engine 316*a* and AI engine 316*b* may execute in the same server as kernel 104. In some other embodiments, AI engine 316*a* and AI engine 316*b* may execute in another server from kernel 104. In yet other embodiments, kernel 104, AI engine 316*a* and AI engine 316*b* may all execute in different servers. In some embodiments, AI engines 316*a* and/or 316*b* may be internal to authentication application 102 (e.g., instantiated using a function call). In some other embodiments, AI engines 316*a* and/or 316*b* may be external to authentication application 102 and may be accessed through respective application programming interfaces (API). Various such configurations are included within the broad scope of the embodiments.

Figure 4A:
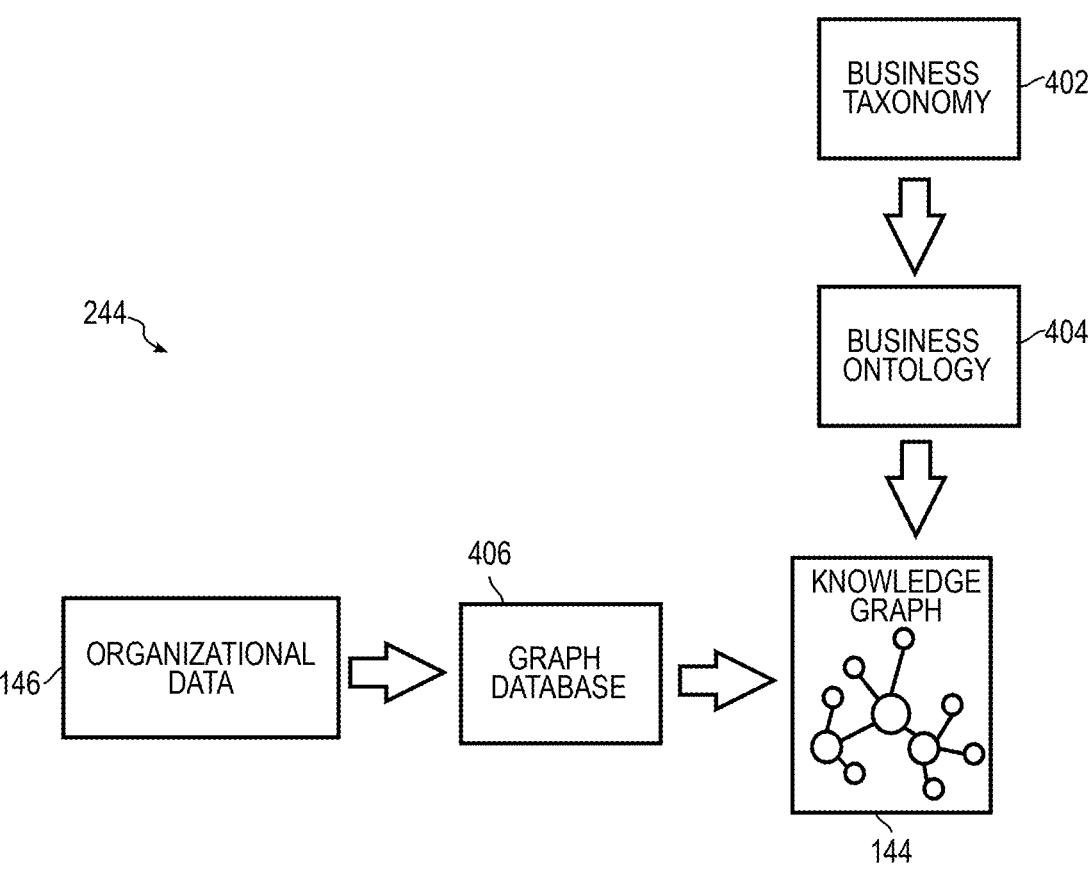
FIGS. 4A-4B are simplified diagrams illustrating example details of the system for real time deepfake identification using knowledge graphs in virtual meetings, according to some embodiments.
Figure 4B:
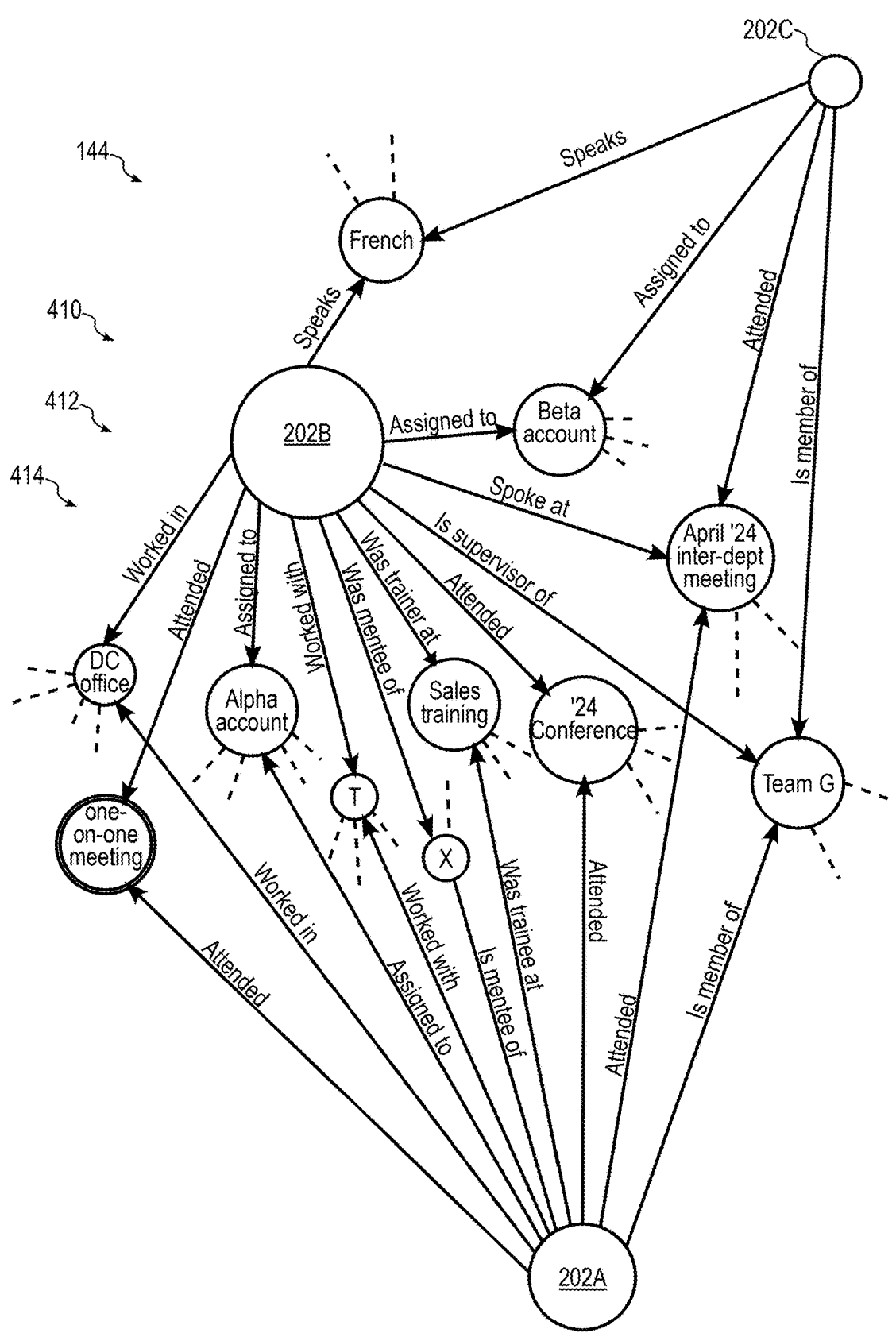

FIGS. 4A-4B are simplified diagrams illustrating example details of knowledge graph instantiate module 244 and knowledge graph 144. Business taxonomy 402 comprises the classification system of organizational data 146, i.e., it represents the organization's vocabulary, common terms, synonyms, etc., serving as a basis for teaching any AI engine the internal language of the organization. In various embodiments, business taxonomy 402 comprises metadata about organizational data 146, enabling data retrieval of structured and unstructured data. In some embodiments, business taxonomy 402 exists as an explicit classification system that is formally enforced, for example, in content management and knowledge management systems; in other embodiments, business taxonomy 402 is an implied classification system that is not formally enforced but exists as an ad-hoc concept underlying any metadata associated with organizational data 146. In some embodiments, a taxonomy software application may tag organizational data 146 with appropriate metatags of business taxonomy 402.

Business taxonomy 402 informs business ontology 404, which is a semantic data model, i.e., a map that describes various things in the organization such as events, products, projects, and people; their attributes, such as name, description, and expertise; and the types of relationships between the things. Business taxonomy 402 enables the context for business ontology 404.

A graph database 406 is a structured databased created by applying attributes and relationships to organizational data 146 such that all things in organizational data 146 are stored with their attributes and are related to other things through appropriate relationships and corresponding attributes. Knowledge graph 144 represents the visualization of data stored in graph database 406 according to business ontology 404. In some embodiments, organizational data 146 may be updated in real time such that graph database 406 and knowledge graph 144 are also updated accordingly in real time. In some other embodiments, organizational data 146 is updated in real time, and graph database 406 is updated according to a predetermined schedule.

Note that in some embodiments, business taxonomy 402 and business ontology 404 may not be separately embodied from graph database 406. In other words, graph database 406 may encompass business taxonomy 402, for example, in the form of metadata; likewise, business ontology 404 may be encompassed by the attributes of things and relationships between things recorded in graph database 406. Whereas knowledge graph 144 is shown in graphical format in this disclosure, it may be noted that the information obtainable from, or included in, knowledge graph 144 may also be obtained from, or be included in, graph database 406. In other words, both knowledge graph 144 and graph database 406 may comprise the same information in different formats. Thus, wherever knowledge graph 144 is referred to herein, it also implies graph database 406, so that the terms may be used interchangeably herein even though they may be implemented differently in system 100. In some embodiments, graph database 406 represents organization-specific data stored in a manner that is not interoperable across domains, whereas knowledge graph 144 may be interoperable and unambiguous based on business ontology 404. In some embodiments, graph database 406 may contain less metadata than knowledge graph 144 and in such embodiments, graph database 406 may not be as semantically rich as knowledge graph 144. In other embodiments, graph database 406 and knowledge graph 144 may comprise the same information and may therefore be semantically equivalent. In various embodiments, graph database 406 may be generated from organizational data 146 and stored in system 100 irrespective of knowledge graph instantiate module 244.

Graph database 406 may be updated periodically or whenever new data is added based on particular needs. In some embodiments, generating and maintaining graph database 406 may be performed by systems such as knowledge management systems outside the scope of the present disclosure. In some other embodiments, authentication application 102 may maintain graph database 406 and knowledge graph 144.

FIG. 4B is a simplified diagram showing an example knowledge graph 144. Knowledge graph 144 shown herein is merely for example purposes and is not to be considered as a limitation. Knowledge graph 144 may vary with the information in organizational data 146 in any manner without departing from the scope of the present disclosure. Assume, merely for illustrative purposes, that user 202a is a high-score user and user 202b is a low-score user, whose trust score 306b is lower than trust score threshold 312. Another user 202c may have a trust score 306c that is lower than trust score 306a but above trust score 306b and trust score threshold 312. In some embodiments, selector 234 may include information on all three users 202a-202c in selected users 318 that is sent to knowledge graph instantiate module 244.

In some embodiments, knowledge graph instantiate module 244 may parse graph database 406, identify users 202a-202c, and extract their mutual connections as knowledge graph 144. Knowledge graph 144 comprises nodes 410 and edges 412. Each node 410 may include information about a person, event, thing, etc. whereas each edge 412 represents a relationship between two nodes 410. In the example shown, assume that users 202a-202c are members of Team G. Users 202a-202c and Team G are represented as nodes 410. Users 202a and 202c are related to Team G as members; thus, corresponding edges 412 connecting users 202a and 202c show that they are members of Team G. On the other hand, user 202b is a supervisor of Team G, and edge 412 connecting user 202b with Team G shows this relationship. Likewise, other nodes with respective attributes are interconnected to nodes representing users 202a-202c by edges having corresponding attributes.

Dotted lines emanating from nodes 410 represent edges with other nodes, such as other users who are not included in the figure. For example, the node representing Team G includes additional dotted lines, indicative of other members of the team who are not shown in knowledge graph 144. In various embodiments, the number of edges associated with a node may be indicative of probability 414 of its content being familiar to users 202 connected thereto. For example, the node labeled "one-on-one meeting" has two edges: one connecting it to user 202a and another connecting it to user 202b, each edge representing attendance at the one-on-one meeting. In other words, the node represents a meeting between users 202a and 202b that was attended only by them. Thus, any content in the node has a high probability of being familiar to only users 202a and 202b. On the other hand, the node representing Team G has many more edges. Thus, any content related to that node will likely be familiar to others besides users 202a and 202b. Thus, the content of the node "one-on-one meeting" between users 202a and 202b has probability 414 of being familiar only to users 202a and 202b that is higher than corresponding probability 414 associated with node "Team G." Thus, the fewer the number of edges connected to any node 410 that is also connected to the relevant users 202, the higher the value of probability 414 that the content in that node 410 is familiar only to the relevant users 202.

In some embodiments, only a pair of users 202, say 202a and 202b or 202c and 202b, may be identified at a time in selected users 318 and provided to knowledge graph instantiate module 244 so that knowledge graph 144 includes the nodes and edges connecting only the pair of users 202.

Nevertheless, each node 410 in such knowledge graph 144 may include information on the number of other edges 412 connection thereto so that probability 414 may be calculated appropriately. In some other embodiments, identifiers of several users 202 may be provided in selected users 318 and consequently, knowledge graph 144 may include more information. Nevertheless, irrespective of how many users 202 are included in knowledge graph 144, each node 410 in knowledge graph 144 may include information on the number of edges 412 connected thereto, so that probability 414 may be calculated appropriately.

In some embodiments, pairwise familiarity is considered for calculating probability 414 (i.e., how likely content in node 410 is familiar to or recognizable by a pair of users 202, say 202a and 202b). In some other embodiments, group familiarity may be considered for calculating probability 414 (i.e., how likely content in node 410 is familiar to or recognizable by all users 202a-202m in the meeting). In yet other embodiments, a partial group familiarity may be considered for calculating probability 414 (i.e., how likely content in node 410 is familiar to a subset of users 202a-202m).

Figure 5:
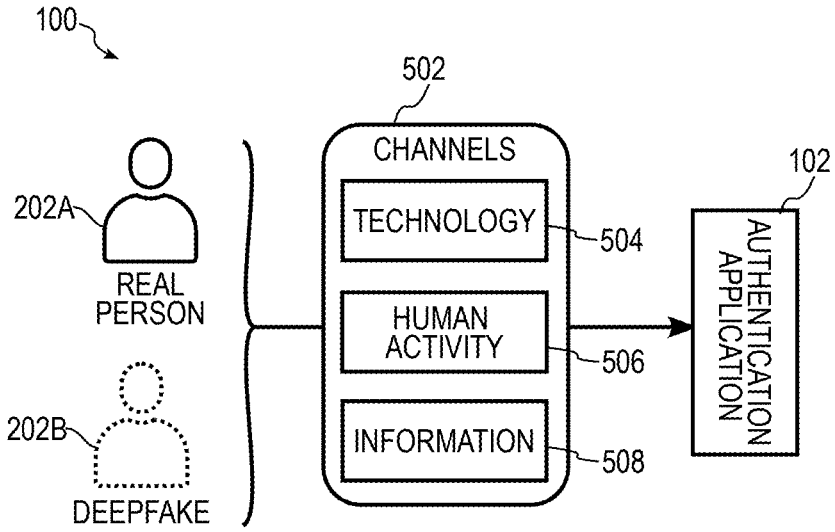
FIG. 5 is a simplified diagram illustrating various example details of the system for real time deepfake identification using knowledge graphs in virtual meetings according to some embodiments.

FIG. 5 is a simplified diagram illustrating different channels 502 that may be used by authentication application 102 in system 100 according to some embodiments. Channels 502 may comprise technology channel 504, human activity channel 506 and information channel 508. Technology channel 504 includes various technology-based means for authentication, such as logging in with a username and password; using MFA; using cryptographic means as described in reference to other figures herein; etc. Human activity channel 506 includes actions taken by a human that are directly related to authentication, such as clicking a "I am not a robot" button on a website to gain access thereto; responding to meeting-bot 106 as described herein by asking question 330 of a suspected deepfake participant in a virtual meeting; etc. Information channel 508 comprises authentication means using information (e.g., knowledge) such as gleaned from organizational data 146 via knowledge graph 144. In various embodiments, authentication application 102 may use all three channels 504-506 to differentiate a deepfake (e.g., user 202b) from a real person (e.g., 202a).

Figure 6:
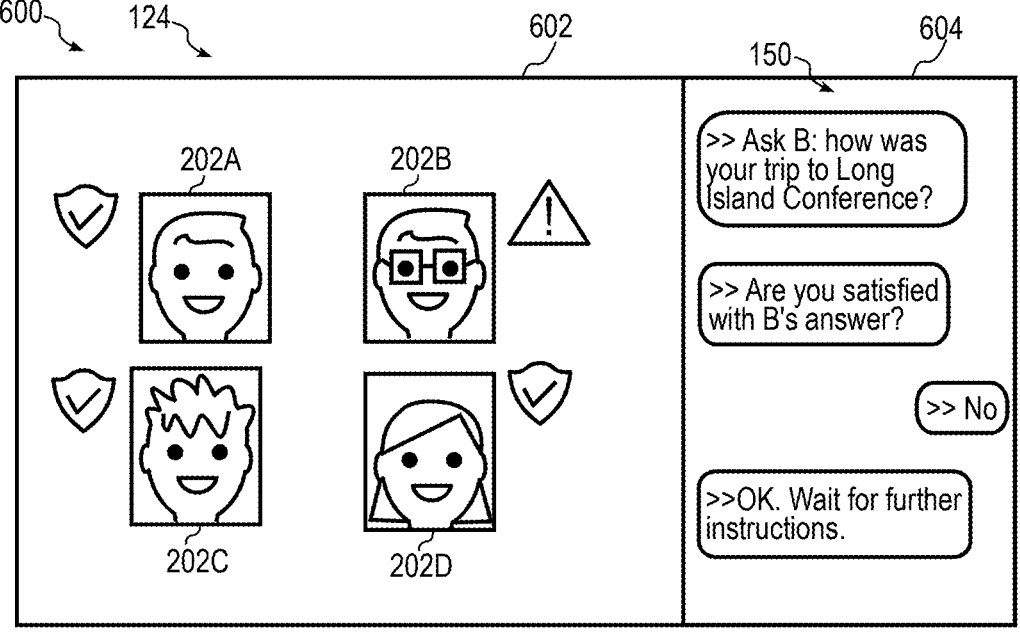
FIG. 6 is a simplified diagram illustrating an example user interface in the system for real time deepfake identification using knowledge graphs in virtual meetings, according to some embodiments.

FIG. 6 is a simplified diagram illustrating an example user interface 600 of meeting application 124. Merely for example purposes and not as a limitation, the view shown is visible to user 202a. In the view, two windows are visible to user 202a: window 602 showing videos or icons representing users 202a-202d; and window 604 showing chat 150 with meeting-bot 106. Assume, merely for example purposes, that user 202b is a suspected deepfake and user 202a has been selected by selector 234 to ask question 330 to user 202b. Meeting-bot 106 may prompt user 202a to ask question 330 suitably in chat 150. For example, question 330 may be "how was your trip to Long Island Conference?" Question 330 may be generated as described in reference to previous figures.

Meeting-bot 106 may wait for an appropriate amount of time (according to preconfigured settings) and then prompt again in chat 150 to get user 202's feedback on the answer provided by user 202b. For example, the prompt may be, "are you satisfied with B's answer?" If user 202a is satisfied, and responds so, user 202b may be classified as authentic and allowed continued access to the virtual meeting. On the other hand, if user 202a is not satisfied with B's answer and responds so, for example, with a chat message, "No," further actions may be triggered in authentication application 102. In one example, meeting-bot 106 may respond to user 202a with a placeholder text, such as "wait for further instructions" while additional steps are taken to confirm the authenticity of user 202b.

Note that the authenticating means by which users 202a-202d access the virtual meeting represents technology channel 504; chat 150 and user 202a's actions to ask the prompted question represents human activity channel 506; and question 330 represents information channel 508.

Figures 7A, 7B, 7C:
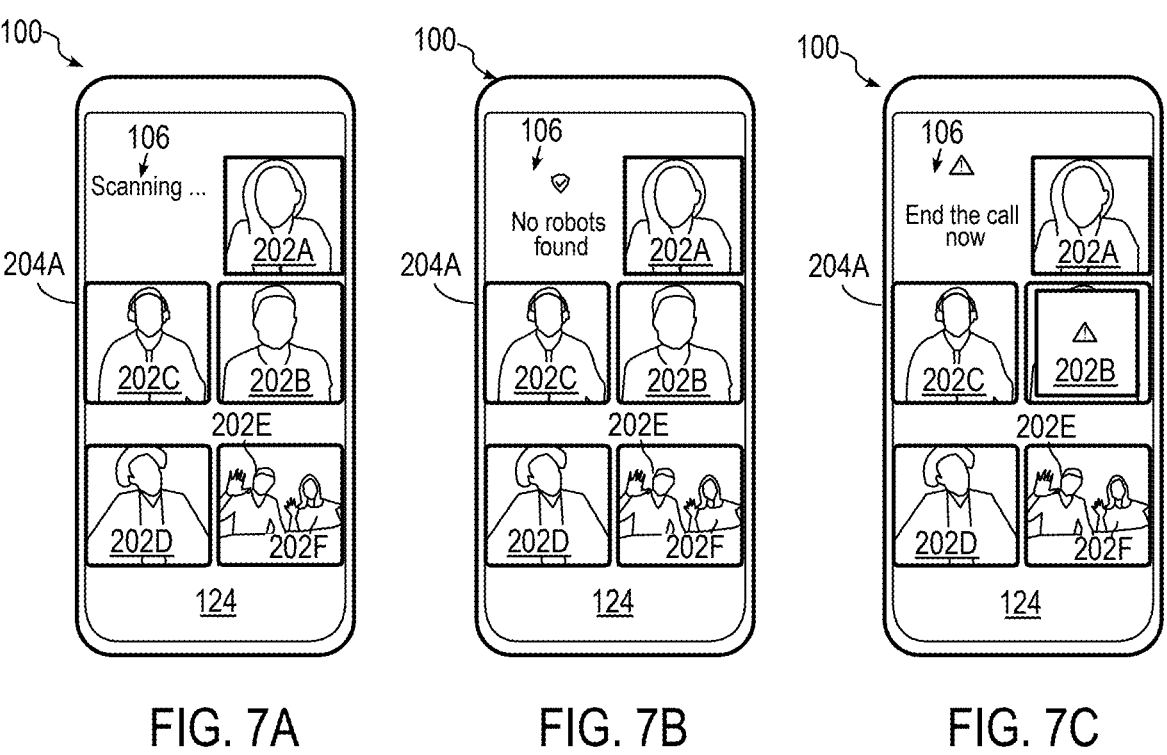
FIGS. 7A-7C are simplified diagrams showing example details of user interfaces in the system for real time deepfake identification using knowledge graphs in virtual meetings, according to some embodiments.

FIGS. 7A-7C are simplified diagrams illustrating example user interfaces for operations in system 100 according to some embodiments. FIG. 7A shows the user interface of meeting application 124 executing in device 204a of user 202a. Various other users 202b-202f access meeting application 124 through their respective device(s) 204b-204f (not shown). Note that more than one user 202, for example, users 202e and 202f, may access meeting application 124 using a single device 204. In various embodiments, meeting-bot 106 executing in meeting application 124 may monitor meeting application 124 and may publish a suitable notification such as "scanning." while monitoring. In some embodiments, meeting-bot 106 may monitor meeting application 124 in the background without notifying any user 202.

FIG. 7B shows the user interface in a scenario in which all users 202a-202f are found to be authenticated and authorized according to the operations described with reference to previous figures. In some embodiments, meeting-bot 106 may publish a suitable message, such as "no robots found" in meeting application 124. In other embodiments, no message may be published, and the virtual meeting may continue uninterrupted.

FIG. 7C shows the user interface in another scenario in which at least one user 202b is found to be inauthentic. In the example shown, a warning may be published to end the call, or the particular inauthentic user 202b may be tagged and called out as a security concern.

Figures 8A, 8B:
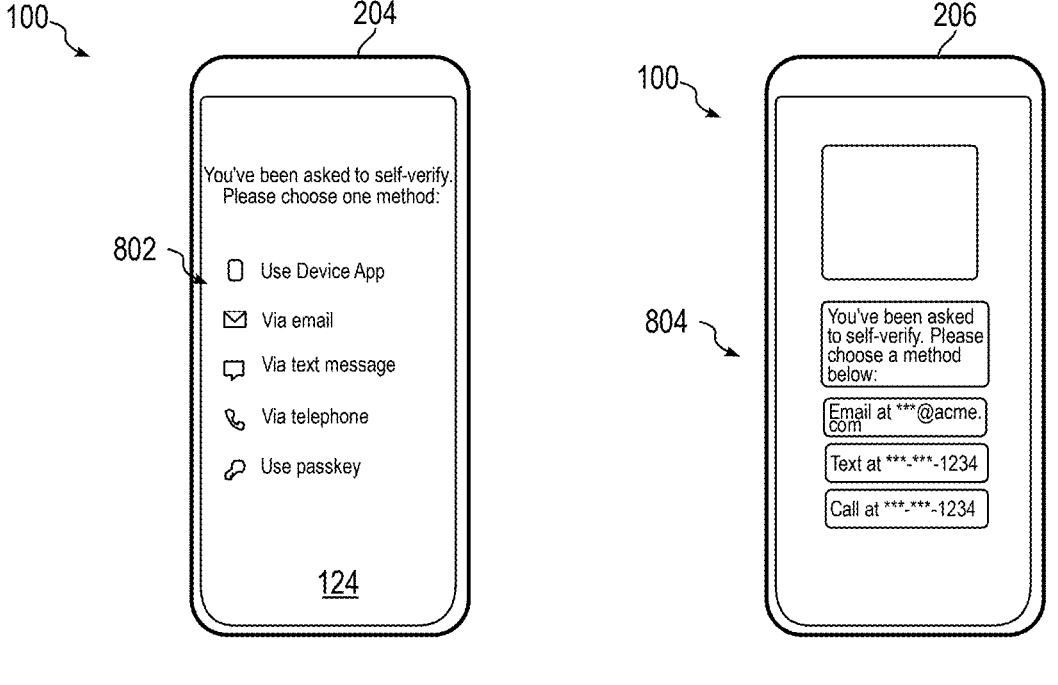
FIGS. 8A-8B are simplified diagrams showing example details of user interfaces in the system for real time deepfake identification using knowledge graphs in virtual meetings, according to some embodiments.

FIGS. 8A-8B are simplified diagrams illustrating other example user interfaces for operations in system 100 according to some embodiments. FIG. 8A shows a notification 802 published in meeting application 124 to the particular user 202b who has failed authentication. Notification 802 may be published by meeting-bot 106 in some embodiments. In other embodiments, notification 802 may be published by meeting application 124. Notification 802 may present various alternative mechanisms for accessing meeting application 124. Examples of such mechanisms include accessing through device application 108; accessing through a link sent via email; accessing through a link sent via text message; accessing through an option sent via telephone; accessing using a passkey; etc. Various such mechanisms may be provisioned by IAM 126. Authentication application 102 may merely present these options without controlling or determining the types of options, the mechanisms for accessing according to these alternatives, etc.

FIG. 8B shows a notification 804 published in trusted-device 206 associated with the particular user 202b who has failed authentication.

Notification 804 may comprise a series of text messages in the example shown, providing various alternative mechanisms for accessing meeting application 124. Note that notification 804 may comprise other forms of notifications, such as emails; push notifications in device application 108; etc. within the broad scope of the embodiments.

Figure 9:
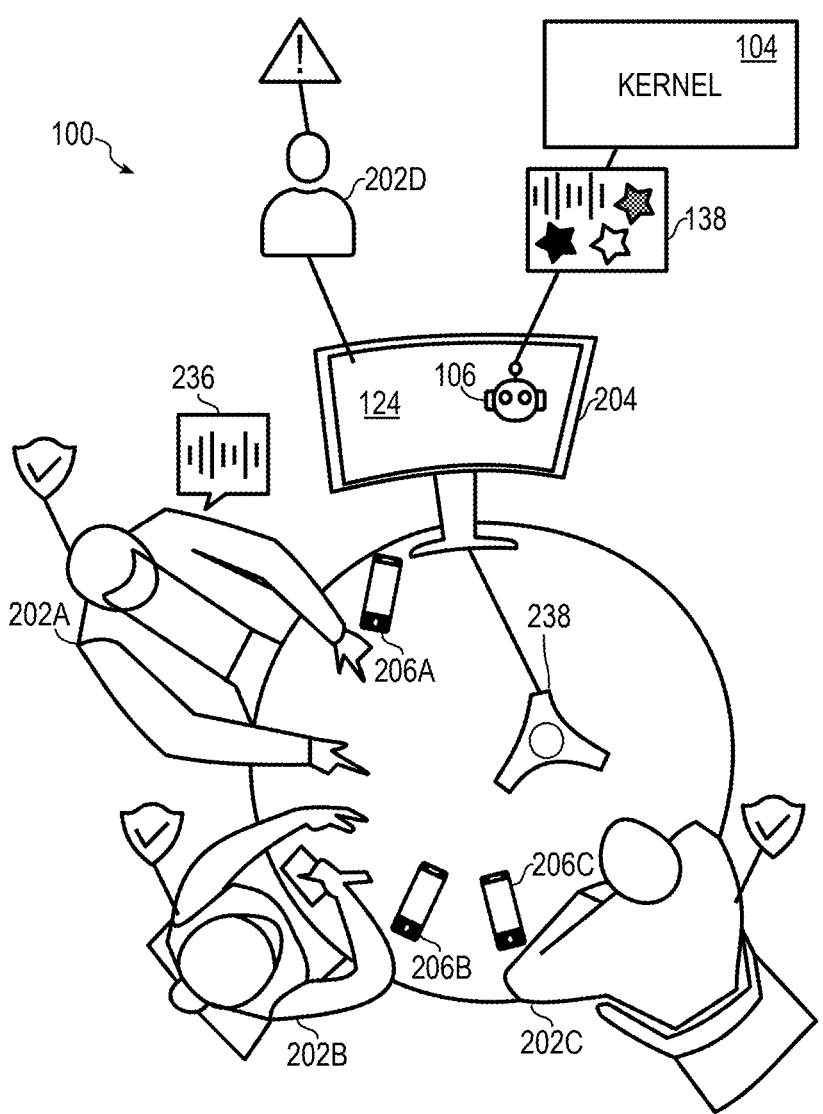
FIG. 9 is a simplified diagram illustrating example details of the system for real time deepfake identification using knowledge graphs in virtual meetings, according to some embodiments.

FIG. 9 is a simplified diagram illustrating example details in system 100 according to some embodiments. Assume that users 202a-202d are accessing meeting application 124 such that users 202a-202c are accessing meeting application 124 altogether on device 204 and user 202d is accessing meeting application 124 on another device. For example, users 202a-202c are all together in one room, face-to-face, in-person, and user 202d is remote. Each user 202a-202d is associated with respective access credential 132a-132d (not shown to prevent clutter). Users 202a-202c may access meeting application 124 by one of at least two ways: using a single access credential, say access credential 132a associated with user 202a; or using separate access credentials 132a-132c corresponding to users 202a-202c, respectively.

In one example, access credential 132a may be used to access meeting application 124 on behalf of users 202a-202d. Data 138 collected by meeting-bot 106 in such a scenario will be associated with access credential 132a only. However, because all three users 202a-202c are present in-person, as among them, the risk of deepfake is zero. User 202d may access meeting application 124 separately using respective access credential 132d.

In another example, each user 202a-202d may separately log into meeting application 124 using respective access credential 132a-132d. During operation of system 100, each of trusted-device 206a-206d may generate and transmit key-signal 238a-238d. Each key-signal 238a-238d encodes a different cryptographic key. Assume, merely for example purposes, that user 202d is flagged as inauthentic because of a low trust score 306d. In some embodiments, trust score 306d may be low merely because user 202d is remote from all other users 202a-202c, who are near each other. In another embodiment, user 202d may have failed the authentication step with key signal 238d, for example, because user 202d's trusted device 206d is not used for the authentication and therefore, no key match is found by kernel 104 as described in reference to previous figures.

Meeting-bot 106 may prompt a selected one of users 202a-202c, say user 202a, to ask question 330 to user 202d. Question 330 may be tailored to content that is most likely to be familiar to users 202a and 202b. Question generator 236 may also take into consideration the fact that users 202b and 202c are present with user 202a; therefore, question 330 may not include private content (e.g., compensation, health, etc.) that is not suitable for sharing or that has not been permitted to be shared with persons other than users 202a and 202b. The mutual proximity of users 202a-202c may be gleaned from the Internet Protocol (IP) address or such other information in some embodiments. In some other embodiments, users 202a-202c may tell meeting-bot 106 in a chat that they are physically together in the meeting room.

Responsive to user 202a's satisfaction with user 202d's answer to question 330, further actions may be taken by authentication application 102. If user 202a is satisfied, user 202d may be classified as authentic and the virtual meeting may be allowed to continue. If user 202a is not satisfied, user 202d may be flagged as inauthentic. In some embodiments, user 202d may be prompted to use alternative mechanisms to access meeting application 124. If such alternative mechanisms fail, then user 202d may be refused access to meeting application 124 within the scope of the embodiments discussed herein. Thus, embodiments of system 100 may use suitable security policies of enterprise security management 120 judiciously to handle scenarios of varying trust scores efficiently. In some embodiments, security policies of IAM

126 may override access denials by authentication application 102 in situations where the trust score is high, as with in-person users. On the other hand, in situations where the trust score is low, as with remote users, security policies of IAM 126 may not override access denials without additional justification. This close interplay between authentication application 102 and enterprise security management 120 tailored to trust score variabilities between different scenarios may enable an efficient, seamless security mechanism for authenticating users 202 in meeting application 124.

Although the present disclosure has been described in detail with reference to particular arrangements and configurations, these example configurations and arrangements may be hanged significantly without departing from the scope of the present disclosure. For example, although the present disclosure has been described with reference to particular types of components, system 100 may be implemented using other components that perform substantially the same functions in similar ways. Moreover, although system 100 has been illustrated with reference to particular elements and operations that facilitate various control system process, these elements, and operations may be replaced by any suitable architecture or process that achieves the intended functionality of system 100.

EXAMPLE METHODS

FIG. 10 is a simplified flow diagram of an example method 1000 for real time deepfake identification using knowledge graphs in virtual meetings according to some embodiments disclosed herein. At 1002, selector 234 in kernel 104 of authentication application 102 may calculate trust scores 306 of users 202 participating in a virtual meeting. Trust scores 306 may be calculated based on predetermined settings or learned (e.g., trained) from previous data. At 1004, responsive to determining that a first user 202a among users 202 has trust score 306a lower than trust score threshold 312, knowledge graph instantiate module 244 may instantiate knowledge graph 144 representing known associations between users 202. In some embodiments, instantiating knowledge graph 144 may comprise selecting a subset of a previously created knowledge graph; selecting a subset of data from a graph database; or creating knowledge graph 144 anew from organizational data 146 using suitable software or other algorithms beyond the scope of the present disclosure.

At 1006, selector 234 may select content in knowledge graph 144 with AI engine 316a using machine learning. In various embodiments, selected content 320 has a higher probability of being recognized by first user 202a and second user 202b among users 202. In various embodiments, the machine learning is trained on organizational data 146 to identify content in knowledge graph 144 and to calculate probabilities of recognition of the content by users 202, for example, users 202a and 202b.

At 1008, AI engine 316b may generate question 330 comprising at least a portion of the content in a tone determined by balancing algorithm 322 that considers an organizational hierarchy of first user 202a and second user 202b. At 1010, kernel 104 may generate instructions 148 to meeting-bot 106 to prompt second user 202b to ask question 330 in the virtual meeting. At 1012, responsive to a reply from second user 202b that the answer by first user 202a to question 330 is satisfactory, kernel 104 may allow the virtual meeting to continue. At 1014, responsive to a reply from second user 202b that the answer by first user 202a to question 330 is not satisfactory, categorizing first user 202a as inauthentic, and performing at least one of the following actions: (i) providing another authentication step to first user 202a for entry into the virtual meeting; (ii) preventing entry by first user 202a to the virtual meeting; and (iii) terminating the virtual meeting.

Figure 11C:
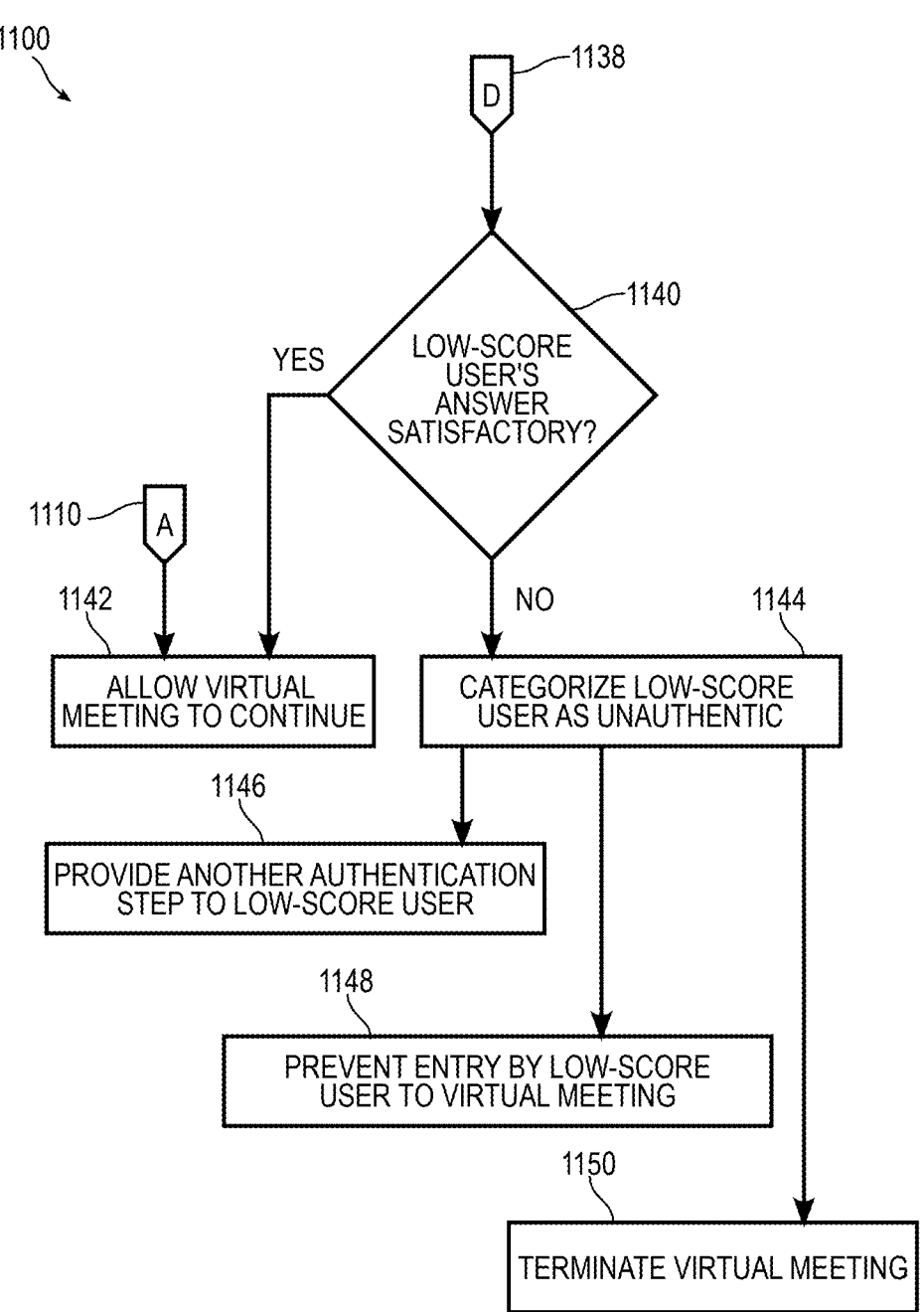

FIGS. 11A-11C are simplified flow diagrams of an example method 1100 for real time deepfake identification using knowledge graphs in virtual meetings according to some embodiments disclosed herein. At 1102, kernel 104 may receive information from meeting-bot 106 that users 202a-202m have completed authentication steps 302a-302n. At 1104, trust score calculator 304 may calculate trust score 306a-306m for each user 202a-202m. In some embodiments, trust score 306a-306m may be calculated based on the type of authentication step 302 completed. In other embodiments, other information may be used to calculate trust scores, such as input 308 by one or more users 202a-202m that one of the participants appears to be a deepfake, etc. At 1106, trust score sorter 310 may sort trust scores 306a-306m and compare against trust score threshold 312. At 1108, a determination may be made whether any trust score 306a-306m is less than trust score threshold 312. If not, the operations step to 1110, which will be described further below.

If any trust score 306, say 306a, is less than trust score threshold 312, at 1112, user 202a having trust score 306a is selected as low-score user. At 1114, another user 202, say 202b, having the highest trust score 306b is selected as high-score user. If all other users 202b-202m have the same value of trust score 306b-306m, then one of users 202b-202m may be randomly selected at 1114 as the high-score user. At 1116, knowledge graph 144 may be instantiated by knowledge graph instantiate module 244. In various embodiments, knowledge graph 144 may represent known associations between the low-score user and the high-score user. The operations continue to 1118 in the next figure.

Turning to FIG. 11B, continuing from 1118 of preceding FIG. 11A, at 1120, content selector 314, using AI engine 316a, may search for content in knowledge graph 144 having high probability of being recognized by the low-score user and the high-score user. At 1122, a determination may be made whether such content is found in knowledge graph 144. If not, the operations step to 1124, at which another user 202, say one with the next highest trust score 306 is selected. If all other users 202c-202m have the same value of trust score 306c-306m, then one of users 202c-202m may be randomly selected at 1124 as the high-score user. The operations step to 1126 and turning back to the preceding figure, to 1116, at which knowledge graph 144 is instantiated with associations between the low-score user and the newly selected high-score user. The operations may continue in loops until suitable content has been found at 1122.

Thereupon at 1128, the identified content is selected as selected content 320. At 1130, question format 324 and question tone 326 may be set by balancing algorithm 322. At 1132, question generator 236, using AI engine 316b, may generate question 330 on selected content 320 to be asked by the high-score user to the low-score user, question 330 being formatted according to question format 324 and in a tone according to question tone 326. At 1134, kernel 104 may generate instructions 148 to meeting-bot 106 to prompt the selected high-score user to ask question 330. At 1136, kernel 104 may analyze the reply from the high-score user regarding the answer by the low-score user to question 330. The operations may continue to 1138, in the next figure.

Turning to FIG. 11C, continuing from 1138 of preceding FIG. 11B, at 1140, a determination may be made whether the low-score user's answer to question 330 is satisfactory. If yes, the operations step to 1142, wherein the virtual meeting is allowed to continue. Note that step 1110 from FIG. 11A is also followed by step 1142. If, at 1140, the determination is that the low-score user's answer to question 330 is not satisfactory, at 1144, the low-score user is categorized as inauthentic and further actions may be taken. For example, at 1146, another authentication step 302 may be provided to the low-score user for entry to the virtual meeting. At 1148, gatekeeper 224 may prevent entry by the low-score user to the virtual meeting. At 1140, the virtual meeting may be terminated. The choice of step 1146, or 1148, or 1150 may be set by enterprise security configurations in some embodiments.

Figure 12:
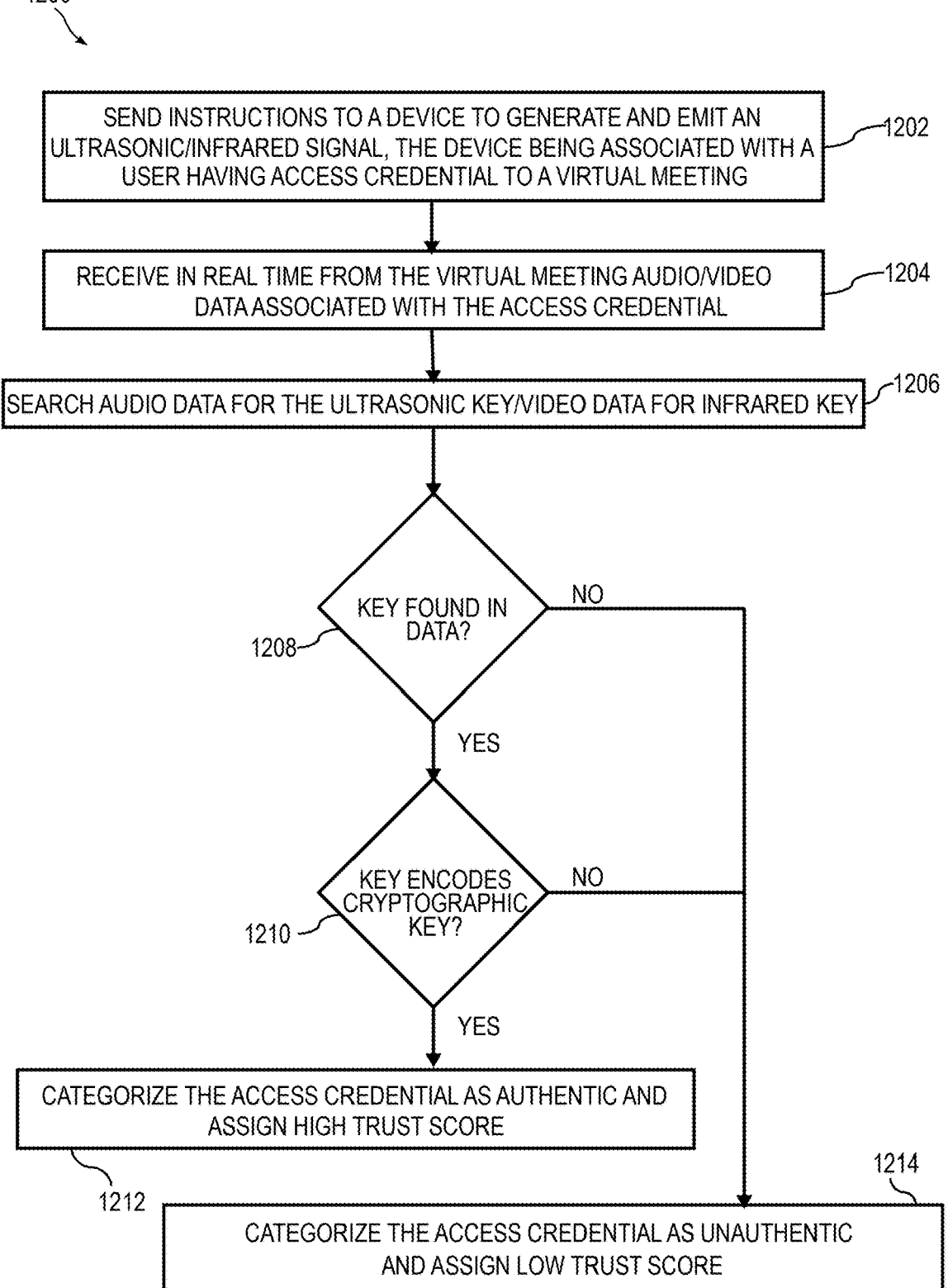
FIG. 12 is a simplified flow diagram of yet another example method for real time deepfake identification using knowledge graphs in virtual meetings according to some embodiments.

FIG. 12 is a simplified flow diagram of an example method 1200 for real time deepfake identification using knowledge graphs in virtual meetings according to some embodiments disclosed herein. At 1202, kernel 104 may send instructions 134 to trusted-device 206 or device 204 to generate and emit key-signal 238. Key-signal 238 may comprise ultrasonic or infrared signals encoding a previously generated cryptographic key associated with access credential 132. At 1204, kernel 104 may receive in real time from the virtual meeting executing in meeting application 124, data 138 associated with access credential 132. In various embodiments, such data 138 may comprise audio or electromagnetic data. Data 138 may be aggregated with other data from other users as well; kernel 104 may separate and extract data 138 associated with a particular one of access credential 132 in some embodiments.

At 1206, kernel 104 may search data 138 for return signal 240 encoding the cryptographic key. At 1208, a determination may be made whether the cryptographic key is found in data 138. Responsive to finding the cryptographic key in data 138, a further determination may be made at 1210 whether the cryptographic key is the same as the one previously generated and associated with access credential 132. Responsive to finding a match, at 1212, kernel 104 may categorize access credential 132 as authentic and assign a high trust score 306 to user 202. On the other hand, at 1208, if a determination is made that a match is not found in data 138, or at 1210, if another determination is made that return signal 240 does not encode the correct cryptographic key, at 1214, access credential 132 may be categorized as inauthentic and a low trust score 306 may be assigned to user 202.

In various embodiments, the operations described in FIGS. 10-12 are performed automatically without human intervention. Although FIGS. 10-12 illustrate various operations performed in a particular order, this is simply illustrative, and the operations discussed herein may be reordered and/or repeated as suitable. Further, additional operations which are not illustrated may also be performed without departing from the scope of the present disclosure. Also, various ones of the operations discussed herein with respect to FIGS. 10-12 may be modified in accordance with the present disclosure to facilitate operations of system 100 as disclosed herein. Although various operations are illustrated in FIGS. 10-12 once each, the operations may be repeated as often as desired.

It is important to note that the operations described with reference to the preceding figures illustrate only some of the possible scenarios that may be executed by, or within, system 100. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion.

SELECT EXAMPLES

Example 1 provides a method for real time deepfake identification using a knowledge graph in a virtual meeting. The method includes: calculating trust scores of users participating in a virtual meeting; responsive to determining that a first user among the users has a trust score below a trust score threshold, instantiating a knowledge graph representing known associations between the users; and selecting content in the knowledge graph by an Artificial Intelligence (AI) engine using machine learning, the content having a higher probability of being recognized by the first user and a second user among the users. The machine learning is trained to identify content in the knowledge graph and to calculate probabilities of recognition of the content by the users. The method further includes: generating, by the AI engine, a question comprising at least a portion of the content in a tone determined by a balancing algorithm that considers an organizational hierarchy of the first user and the second user; generating instructions to a meeting-bot executing in the virtual meeting to prompt the second user to ask the question in the virtual meeting; responsive to a reply from the second user that an answer to the question by the first user is satisfactory, allowing the virtual meeting to continue; and responsive to a reply from the second user that the answer to the question by the first user is not satisfactory, categorizing the first user as inauthentic, and performing at least one of the following actions: (i) providing another authentication step to the first user for entry into the virtual meeting; (ii) preventing entry by the first user to the virtual meeting; and (iii) terminating the virtual meeting.

Example 2 provides the method of example 1, in which the second user has a higher trust score than all other users.

Example 3 provides the method of example 1, in which at least one authentication step completed by the users includes: sending instructions to a respective device associated with each user to generate and emit at least one of: (i) a coded ultrasonic signal, and (ii) a coded infrared signal; and receiving in real time from the virtual meeting, at least one of: (i) audio data associated with the users and (ii) video data associated with the users.

Example 4 includes the method of example 3, further including: performing a search of at least one of: (i) the audio data for the coded ultrasonic signal, and (ii) the video data for the coded infrared signal; and responsive to not finding at least one of (i) the coded ultrasonic signal in the audio data and (ii) the coded infrared signal in the video data, generating a trust score that is lower than the trust score threshold.

Example 5 provides the method of example 1, in which the trust score of the first user is generated based on input by any other user to the meeting-bot about possible inauthenticity of the first user.

Example 6 provides the method of example 1, in which the balancing algorithm further considers a plurality of factors according to preconfigured settings.

Example 7 provides the method of example 1, in which the knowledge graph is generated from organizational data, and the organizational data is updated in real time.

Example 8 provides non-transitory computer-readable tangible media that includes instructions for execution, which when executed by a processor of a computing device, is operable to perform operations including: calculating trust scores of users participating in a virtual meeting; responsive to determining that a first user among the users has a trust score below a trust score threshold, instantiating a knowledge graph representing known associations between the users; and selecting content in the knowledge graph by an Artificial Intelligence (AI) engine using machine learning, the content having a higher probability of being recognized by the first user and a second user among the users. The machine learning is trained to identify content in the knowledge graph and to calculate probabilities of recognition of the content by the users. The method further includes: generating, by the AI engine, a question comprising at least a portion of the content in a tone determined by a balancing algorithm that considers an organizational hierarchy of the first user and the second user; generating instructions to a meeting-bot executing in the virtual meeting to prompt the second user to ask the question in the virtual meeting; responsive to a reply from the second user that an answer to the question by the first user is satisfactory, allowing the virtual meeting to continue; and responsive to a reply from the second user that the answer to the question by the first user is not satisfactory, categorizing the first user as inauthentic, and performing at least one of the following actions: (i) providing another authentication step to the first user for entry into the virtual meeting; (ii) preventing entry by the first user to the virtual meeting; and (iii) terminating the virtual meeting.

Example 9 provides the non-transitory computer-readable tangible media of example 8, in which the second user has a higher trust score than all other users.

Example 10 provides the non-transitory computer-readable tangible media of example 8, in which at least one authentication step completed by the users comprises: sending instructions to a respective device associated with each user to generate and emit at least one of: (i) a coded ultrasonic signal, and (ii) a coded infrared signal; and receiving in real time from the virtual meeting, at least one of: (i) audio data associated with the users and (ii) video data associated with the users.

Example 11 provides the non-transitory computer-readable tangible media of example 10, in which the operations further comprise: performing a search of at least one of: (i) the audio data for the coded ultrasonic signal, and (ii) the video data for the coded infrared signal; and responsive to not finding at least one of (i) the coded ultrasonic signal in the audio data and (ii) the coded infrared signal in the video data, generating a trust score that is lower than the trust score threshold.

Example 12 provides the non-transitory computer-readable tangible media of example 8, in which the trust score of the first user is generated based on input by any other user to the meeting-bot about possible inauthenticity of the first user.

Example 13 provides the non-transitory computer-readable tangible media of example 8, in which the balancing algorithm further considers a plurality of factors according to preconfigured settings.

Example 14 provides the non-transitory computer-readable tangible media of example 8, in which the knowledge graph is generated from organizational data, and the organizational data is updated in real time.

Example 15 provides an apparatus comprising: a processing circuitry; a memory storing data; and a communication circuitry, in which the processing circuitry executes instructions associated with the data, the processing circuitry is coupled to the communication circuitry and the memory, and the processing circuitry and the memory cooperate, such that the apparatus is configured for: calculating trust scores of users participating in a virtual meeting; responsive to determining that a first user among the users has a trust score below a trust score threshold, instantiating a knowledge graph representing known associations between the users; and selecting content in the knowledge graph by an Artificial Intelligence (AI) engine using machine learning, the content having a higher probability of being recognized by the first user and a second user among the users. The machine learning is trained to identify content in the knowledge graph and to calculate probabilities of recognition of the content by the users. The method further includes: generating, by the AI engine, a question comprising at least a portion of the content in a tone determined by a balancing algorithm that considers an organizational hierarchy of the first user and the second user; generating instructions to a meeting-bot executing in the virtual meeting to prompt the second user to ask the question in the virtual meeting; responsive to a reply from the second user that an answer to the question by the first user is satisfactory, allowing the virtual meeting to continue; and responsive to a reply from the second user that the answer to the question by the first user is not satisfactory, categorizing the first user as inauthentic, and performing at least one of the following actions: (i) providing another authentication step to the first user for entry into the virtual meeting; (ii) preventing entry by the first user to the virtual meeting; and (iii) terminating the virtual meeting.

Example 16 provides the apparatus of example 15, in which the second user has a higher trust score than all other users.

Example 17 provides the apparatus of example 15, in which at least one authentication step completed by the users comprises: sending instructions to a respective device associated with each user to generate and emit at least one of: (i) a coded ultrasonic signal, and (ii) a coded infrared signal; and receiving in real time from the virtual meeting, at least one of: (i) audio data associated with the users and (ii) video data associated with the users.

Example 18 provides the apparatus of example 17, in which the apparatus is further configured for: performing a search of at least one of: (i) the audio data for the coded ultrasonic signal, and (ii) the video data for the coded infrared signal; and responsive to not finding at least one of (i) the coded ultrasonic signal in the audio data and (ii) the coded infrared signal in the video data, generating a trust score that is lower than the trust score threshold.

Example 19 provides the apparatus of example 15, in which the trust score of the first user is generated based on input by any other user to the meeting-bot about possible inauthenticity of the first user.

Example 20 provides the apparatus of example 15, in which the balancing algorithm further considers a plurality of factors according to preconfigured settings.

The above description of illustrated implementations of the disclosure, including what is described in the abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize.

The invention claimed is:

1. A method for real time deepfake identification using a knowledge graph in a virtual meeting, the method comprising:

calculating trust scores of users participating in a virtual meeting;

responsive to determining that a first user among the users has a trust score below a trust score threshold, instantiating a knowledge graph representing known associations between the users;

selecting content in the knowledge graph by an Artificial Intelligence (AI) engine using machine learning, the content having a higher probability of being recognized by the first user and a second user among the users, wherein the machine learning is trained to identify content in the knowledge graph and to calculate probabilities of recognition of the content by the users;

generating, by the AI engine, a question comprising at least a portion of the content in a tone determined by a balancing algorithm that considers an organizational hierarchy of the first user and the second user;

generating instructions to a meeting-bot executing in the virtual meeting to prompt the second user to ask the question in the virtual meeting;

responsive to a reply from the second user that an answer to the question by the first user is satisfactory, allowing the virtual meeting to continue; and responsive to a reply from the second user that the answer to the question by the first user is not satisfactory, categorizing the first user as inauthentic, and performing at least one of: (i) providing another authentication step to the first user for entry into the virtual meeting; (ii) preventing entry by the first user to the virtual meeting; and (iii) terminating the virtual meeting.

2. The method of claim 1, wherein the second user has a higher trust score than all other users.

3. The method of claim 1, wherein at least one authentication step completed by the users comprises:

sending instructions to a respective device associated with each user to generate and emit at least one of: (i) a coded ultrasonic signal, and (ii) a coded infrared signal; and receiving in real time from the virtual meeting, at least one of: (i) audio data associated with the users and (ii) video data associated with the users.

4. The method of claim 3, further comprising:

performing a search of at least one of: (i) the audio data for the coded ultrasonic signal, and (ii) the video data for the coded infrared signal; and responsive to not finding at least one of (i) the coded ultrasonic signal in the audio data and (ii) the coded infrared signal in the video data, generating a trust score that is lower than the trust score threshold.

5. The method of claim 1, wherein the trust score of the first user is generated based on input by any other user to the meeting-bot about possible inauthenticity of the first user.

6. The method of claim 1, wherein the balancing algorithm further considers a plurality of factors according to preconfigured settings.

7. The method of claim 1, wherein:

the knowledge graph is generated from organizational data, and the organizational data is updated in real time.

8. Non-transitory computer-readable tangible media that includes instructions for execution, which when executed by a processor of a computing device, is operable to perform operations comprising:

calculating trust scores of users participating in a virtual meeting;

responsive to determining that a first user among the users has a trust score below a trust score threshold, instantiating a knowledge graph representing known associations between the users;

selecting content in the knowledge graph by an Artificial Intelligence (AI) engine using machine learning, the content having a higher probability of being recognized by the first user and a second user among the users, wherein the machine learning is trained to identify content in the knowledge graph and to calculate probabilities of recognition of the content by the users;

generating, by the AI engine, a question comprising at least a portion of the content in a tone determined by a balancing algorithm that considers an organizational hierarchy of the first user and the second user;

generating instructions to a meeting-bot executing in the virtual meeting to prompt the second user to ask the question in the virtual meeting;

responsive to a reply from the second user that an answer to the question by the first user is satisfactory, allowing the virtual meeting to continue; and responsive to a reply from the second user that the answer to the question by the first user is not satisfactory, categorizing the first user as inauthentic, and performing at least one of: (i) providing another authentication step to the first user for entry into the virtual meeting; (ii) preventing entry by the first user to the virtual meeting; and (iii) terminating the virtual meeting.

9. The non-transitory computer-readable tangible media of claim 8, wherein the second user has a higher trust score than all other users.

10. The non-transitory computer-readable tangible media of claim 8, wherein at least one authentication step completed by the users comprises:

sending instructions to a respective device associated with each user to generate and emit at least one of: (i) a coded ultrasonic signal, and (ii) a coded infrared signal; and receiving in real time from the virtual meeting, at least one of: (i) audio data associated with the users and (ii) video data associated with the users.

11. The non-transitory computer-readable tangible media of claim 10, wherein the operations further comprise:

performing a search of at least one of: (i) the audio data for the coded ultrasonic signal, and (ii) the video data for the coded infrared signal; and responsive to not finding at least one of (i) the coded ultrasonic signal in the audio data and (ii) the coded infrared signal in the video data, generating a trust score that is lower than the trust score threshold.

12. The non-transitory computer-readable tangible media of claim 8, wherein the trust score of the first user is generated based on input by any other user to the meeting-bot about possible inauthenticity of the first user.

13. The non-transitory computer-readable tangible media of claim 8, wherein the balancing algorithm further considers a plurality of factors according to preconfigured settings.

14. The non-transitory computer-readable tangible media of claim 8, wherein:

the knowledge graph is generated from organizational data, and the organizational data is updated in real time.

33

15. An apparatus comprising:
a processing circuitry;
a memory storing data; and
a communication circuitry, wherein the processing circuitry executes instructions associated with the data, the processing circuitry is coupled to the communication circuitry and the memory, and the processing circuitry and the memory cooperate, such that the apparatus is configured for:
calculating trust scores of users participating in a virtual meeting;
responsive to determining that a first user among the users has a trust score below a trust score threshold, instantiating a knowledge graph representing known associations between the users;
selecting content in the knowledge graph by an Artificial Intelligence (AI) engine using machine learning, the content having a higher probability of being recognized by the first user and a second user among the users, wherein the machine learning is trained to identify content in the knowledge graph and to calculate probabilities of recognition of the content by the users;
generating, by the AI engine, a question comprising at least a portion of the content in a tone determined by a balancing algorithm that considers an organizational hierarchy of the first user and the second user;
generating instructions to a meeting-bot executing in the virtual meeting to prompt the second user to ask the question in the virtual meeting;
responsive to a reply from the second user that an answer to the question by the first user is satisfactory, allowing the virtual meeting to continue; and
responsive to a reply from the second user that the answer to the question by the first user is not satisfactory, categorizing the first user as inauthentic, and performing at least one of: (i) providing another authentication step to the first user for entry into the virtual meeting; (ii) preventing entry by the first user to the virtual meeting; and (iii) terminating the virtual meeting.

16. The apparatus of claim 15, wherein the second user has a higher trust score than all other users.

17. The apparatus of claim 15, wherein at least one authentication step completed by the users comprises:
sending instructions to a respective device associated with each user to generate and emit at least one of: (i) a coded ultrasonic signal, and (ii) a coded infrared signal; and
receiving in real time from the virtual meeting, at least one of: (i) audio data associated with the users and (ii) video data associated with the users.

18. The apparatus of claim 17, wherein the apparatus is further configured for:
performing a search of at least one of: (i) the audio data for the coded ultrasonic signal, and (ii) the video data for the coded infrared signal; and
responsive to not finding at least one of (i) the coded ultrasonic signal in the audio data and (ii) the coded infrared signal in the video data, generating a trust score that is lower than the trust score threshold.

19. The apparatus of claim 15, wherein the trust score of the first user is generated based on input by any other user to the meeting-bot about possible inauthenticity of the first user.

20. The apparatus of claim 15, wherein the balancing algorithm further considers a plurality of factors according to preconfigured settings.

* * * * *